(12) United States Patent
Kolan

(10) Patent No.: US 11,496,532 B2
(45) Date of Patent: Nov. 8, 2022

(54) OFFERING MEDIA SERVICES THROUGH NETWORK EDGE

(71) Applicant: Samsung Electronics Co., Ltd., Suwon-si (KR)

(72) Inventor: Prakash Kolan, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/225,032

(22) Filed: Apr. 7, 2021

(65) Prior Publication Data

US 2021/0320955 A1    Oct. 14, 2021

Related U.S. Application Data

(60) Provisional application No. 63/011,131, filed on Apr. 16, 2020, provisional application No. 63/008,299, filed on Apr. 10, 2020.

(51) Int. Cl.
*H04L 65/60* (2022.01)
*H04L 65/1023* (2022.01)
(Continued)

(52) U.S. Cl.
CPC .......... *H04L 65/60* (2013.01); *H04L 65/1026* (2013.01); *H04L 65/1059* (2013.01); *H04L 65/1063* (2013.01); *H04L 65/1101* (2022.05)

(58) Field of Classification Search
CPC . H04L 65/60; H04L 65/1003; H04L 65/1026; H04L 65/1059; H04L 65/1063; H04L 65/4084; H04L 65/605
See application file for complete search history.

(56) References Cited

U.S. PATENT DOCUMENTS

| 11,196,778 B2 * | 12/2021 | Sodagar | H04L 65/1069 |
| 2004/0172445 A1 * | 9/2004 | Singh | G06Q 10/10 |
| | | | 709/200 |

(Continued)

FOREIGN PATENT DOCUMENTS

KR    10-2019-0033022 A    3/2019

OTHER PUBLICATIONS

International Search Report dated Jul. 27, 2021 in connection with International Patent Application No. PCT/KR2021/004526, 3 pages.

(Continued)

*Primary Examiner* — Aftab N. Khan

(57) ABSTRACT

An apparatus includes a communication interface and a processor operably coupled to the communication interface. The communication interface receives, from an application provider, a signaling message for provisioning into a network-based media processing (NBMP) workflow manager. The processor assumes a role of the NBMP workflow manager. The processor also communicates with an edge configuration server and an edge enabler server in an edge network to determine functionality of edge media application functions in the edge network. The processor further provisions at least one media application function as at least one media processing entity in a workflow. In addition, the processor instructs a media source to provide content for processing to the at least one media processing entity and instructs the at least one media processing entity in the workflow to provide the processed content to a user equipment (UE).

16 Claims, 19 Drawing Sheets

(51) Int. Cl.
*H04L 65/1059* (2022.01)
*H04L 65/1063* (2022.01)
*H04L 65/1101* (2022.01)

(56) References Cited

U.S. PATENT DOCUMENTS

| | | |
|---|---|---|
| 2019/0222621 A1 | 7/2019 | Kolan et al. |
| 2020/0020077 A1 | 1/2020 | You et al. |
| 2020/0092530 A1* | 3/2020 | Wang .................... H04N 13/161 |
| 2020/0110633 A1 | 4/2020 | Kolan et al. |
| 2020/0296431 A1* | 9/2020 | Sodagar ............ H04N 21/64784 |
| 2020/0302575 A1* | 9/2020 | Lee ........................ G06T 3/4038 |
| 2020/0304423 A1* | 9/2020 | Sodagar .................. H04L 43/08 |
| 2020/0304508 A1* | 9/2020 | Bae ..................... H04L 63/0876 |
| 2020/0341802 A1* | 10/2020 | Sodagar ..................... G06F 9/48 |
| 2020/0341803 A1* | 10/2020 | Sodagar ................. G06F 16/953 |
| 2020/0341806 A1* | 10/2020 | Sodagar .................. H04L 65/80 |
| 2020/0344318 A1* | 10/2020 | Sodagar ................ H04L 47/827 |
| 2020/0344323 A1* | 10/2020 | Sodagar ............... H04N 21/234 |
| 2020/0412837 A1* | 12/2020 | Sodagar ............... H04N 21/643 |
| 2021/0004273 A1* | 1/2021 | You ....................... G06F 9/5066 |
| 2021/0096922 A1* | 4/2021 | Sodagar ................ G06F 9/5016 |
| 2021/0105338 A1* | 4/2021 | Oyman ................. H04L 67/146 |
| 2021/0120049 A1* | 4/2021 | Sodagar ............... H04N 21/482 |
| 2021/0136177 A1* | 5/2021 | Hall ....................... H04L 67/289 |
| 2021/0218787 A1* | 7/2021 | Sodagar .................. H04L 65/61 |
| 2021/0306229 A1* | 9/2021 | Sodagar .................. H04L 65/65 |
| 2021/0314379 A1* | 10/2021 | Sodagar .................. G06F 15/16 |

OTHER PUBLICATIONS

Written Opinion of the International Searching Authority dated Jul. 27, 2021 in connection with International Patent Application No. PCT/KR2021/004526, 4 pages.

"3rd Generation Partnership Project; Technical Specification Group Services and System Aspects; Architecture for enabling Edge Applications (Release 17)", 3GPP TS 23.558 v2.0.0, Mar. 2021, 141 pages.

"3rd Generation Partnership Project; Technical Specification Group Services and System Aspects; 5G Media Streaming (5GMS); General description and architecture (Release 16)", 3GPP TS 26.501 V16.6.1, Jan. 2021, 79 pages.

"3rd Generation Partnership Project; Technical Specification Group Services and System Aspects; 5G Media Streaming (5GMS); Protocols (Release 16)", 3GPP TS 26.512 v16.1.0, Dec. 2020, 96 pages.

"3rd Generation Partnership Project; Technical Specification Group Services and System Aspects; Uplink Streaming Framework (Release 15)", 3GPP TS 26.238 v0.0.1, Jun. 2017, 12 pages.

"3rd Generation Partnership Project; Technical Specification Group Services and System Aspects; Guidelines on the Framework for Live Uplink Streaming; (Release 15)", 3GPP TR 26.939 v0.0.1, Feb. 2018, 9 pages.

"Information technology—Coded representation of immersive media—Part 8: Network Based Media Processing" ISO 23090-8-2018(E); ISO/IEC JTC1/SC 29/WG 11, ISO 2018, 100 pages.

\* cited by examiner

OFFERING MEDIA SERVICES THROUGH NETWORK EDGE

CROSS-REFERENCE TO RELATED APPLICATION AND PRIORITY CLAIM

This application claims priority under 35 U.S.C. § 119(e) to U.S. Provisional Patent Application No. 63/008,299 filed on Apr. 10, 2020, and U.S. Provisional Patent Application No. 63/011,131 filed on Apr. 16, 2020, which are hereby incorporated by reference in their entirety.

TECHNICAL FIELD

This disclosure relates generally to volumetric media devices and processes. More specifically, this disclosure relates to a system and methods for offering media service through an edge network.

BACKGROUND

Edge Processing offers advantages for offering mobile operator services by deploying compute capacity closer to the edge network, i.e. closer to end users. Different standard organizations such as 3rd Generation Partnership Project (3GPP), Moving Pictures Experts Group (MPEG), European Telecommunications Standard Institute (ETSI), etc., have studied architectures for edge processing. 3GPP is currently standardizing architecture for offering edge-based services. 3GPP is also simultaneously standardizing architecture for a number of media services (e.g., media streaming, rendering in the cloud etc.). Most of these media services can be improved with a standardized edge-based architecture. In addition, deploying these media services at the edge network may require novel methods for realization of these services as the service considerations are different than scenarios when the same services are deployed in the operator's core network.

SUMMARY

This disclosure provides a system and methods for offering media service through an edge network.

In a first embodiment, an apparatus includes a communication interface and a processor operably coupled to the communication interface. The communication interface receives, from an application provider, a signaling message for provisioning into a network-based media processing (NBMP) workflow manager. The processor assumes a role of the NBMP workflow manager. The processor also communicates with an edge configuration server and an edge enabler server in an edge network to determine functionality of edge media application functions in the edge network. The processor further provisions at least one media application function as at least one media processing entity in a workflow. In addition, the processor instructs a media source to provide content for processing to the at least one media processing entity and instructs the at least one media processing entity in the workflow to provide the processed content to a user equipment (UE).

In a second embodiment, an apparatus includes a communication interface and a processor operably coupled to the communication interface. The communication interface is configured to receive, from an application provider or a network-based media processing (NBMP) workflow manager in a core network, a signaling message for provisioning into an edge NBMP workflow manager. The processor is configured to assume a role of the edge NBMP workflow manager. The processor is also configured to provision at least one edge media application function as at least one media processing entity in a workflow. The processor is further configured to instruct a media source to provide content for processing to the at least one media processing entity and instruct the at least one media processing entity in the workflow to provide the processed content to a user equipment (UE).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 19, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

The use of computing technology for media processing is greatly expanding, largely due to the usability, convenience, computing power of computing devices, and the like. Portable electronic devices, such as laptops and mobile smart phones are becoming increasingly popular as a result of the devices becoming more compact, while the processing power and resources included a given device is increasing. Even with the increase of processing power, portable electronic devices often struggle to provide the processing capabilities to handle new services and applications, as newer services and applications often require more resources that is included in a portable electronic device. Improved methods and apparatus for configuring and deploying media processing in the network is required.

Cloud media processing is gaining traction where media processing workloads are setup in the network (e.g., cloud) to take advantage of advantages of the benefits offered by the cloud such as (theoretically) infinite compute capacity, auto-scaling based on need, and on-demand processing. An end user client can request a network media processing provider for provisioning and configuration of media processing functions as required.

Cloud media processing is being increasingly used for realizing complex media use cases that are otherwise impossible to be run on existing mobile devices. Workloads are offloaded to network/cloud so relevant media data/metadata can be processed in the cloud and the result sent back to mobile devices. ISO/IEC 23090-8 specification describes an enabler called Network Based Media Processing (NBMP) that lets devices request a network/cloud entity for media processing by sending a workflow description document. The workflow description document provides all necessary details about the type of input, processing required, expected output, and the recipients. The network/cloud entity sets up cloud resources to provide the required processing, helps in routing media/metadata from client devices to these cloud resources, and forward the processed media data/metadata to the intended recipients.

3GPP 26.238 and 3GPP TR 26.939 describes an enabler for Flexible Live Uplink Streaming (FLU) live uplink streaming services. A FLUS source sets up a session with a FLUS sink and streams content to the sink. The sink receives the streamed data and uses it for further purposes (e.g., distribute it to a set of recipients, store it etc.) This application describes ways for marrying the two architectures to provide live uplink streaming services using NBMP.

Figure 1:
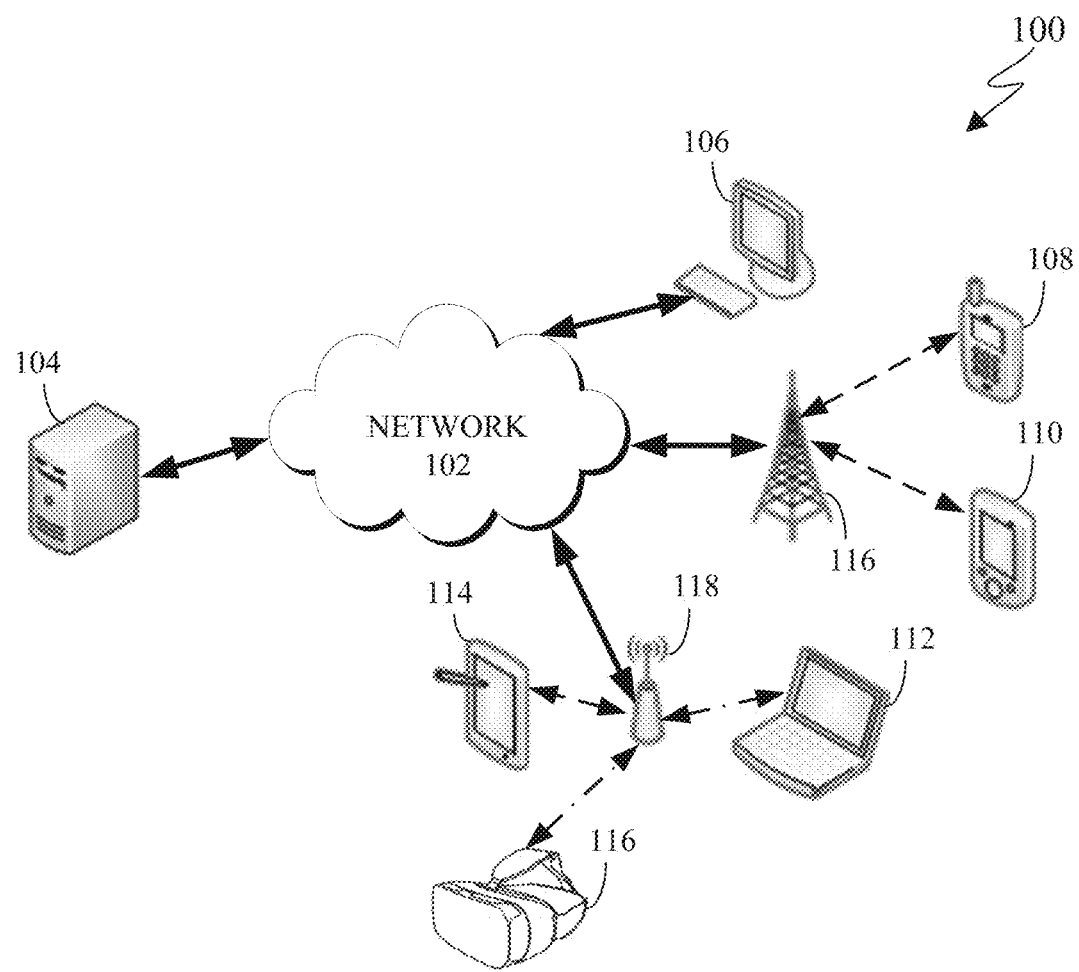
FIG. 1 illustrates an example communication system in accordance with an embodiment of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can provision nodes in a core network or an edge network. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeB s (eNB s). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to capture volumetric data, generate a bitstream that represents the volumetric data, and transmit the bitstream to a server on a core network or an edge network.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104. In certain embodiments, any of the client devices 106-116 or the server 104 can capture or store volumetric data, compress a data stream including the volumetric data, transmit the volumetric data to a server in a core network or an edge network, receive a volumetric data.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
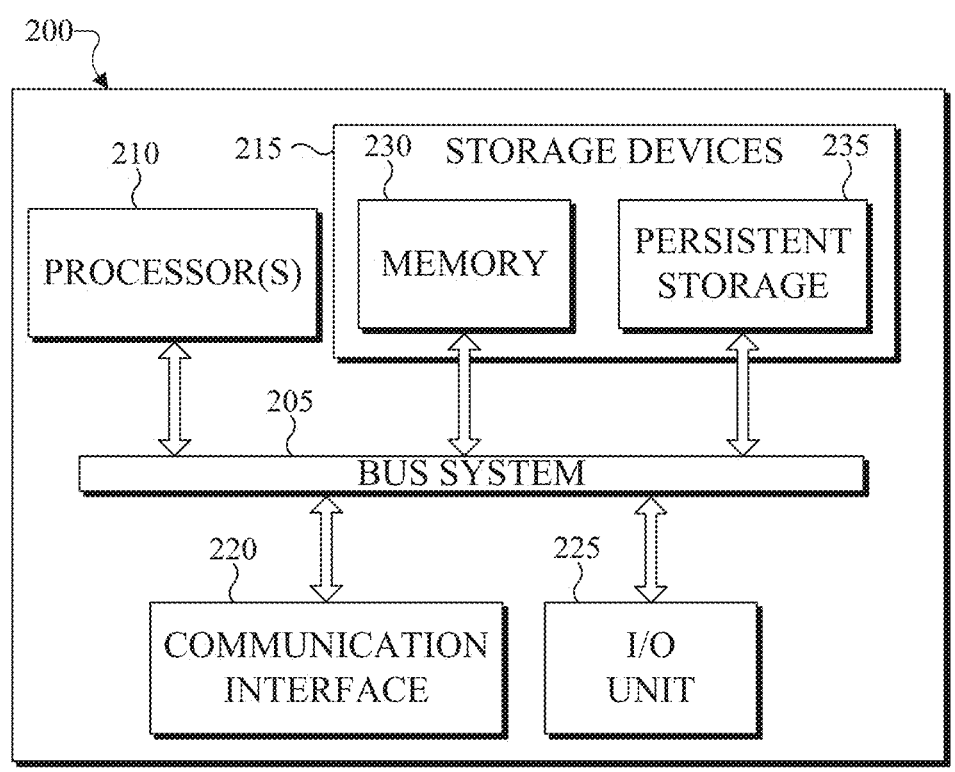
FIGS. 2 and 3 illustrate example electronic devices in accordance with an embodiment of this disclosure.
Figure 3:
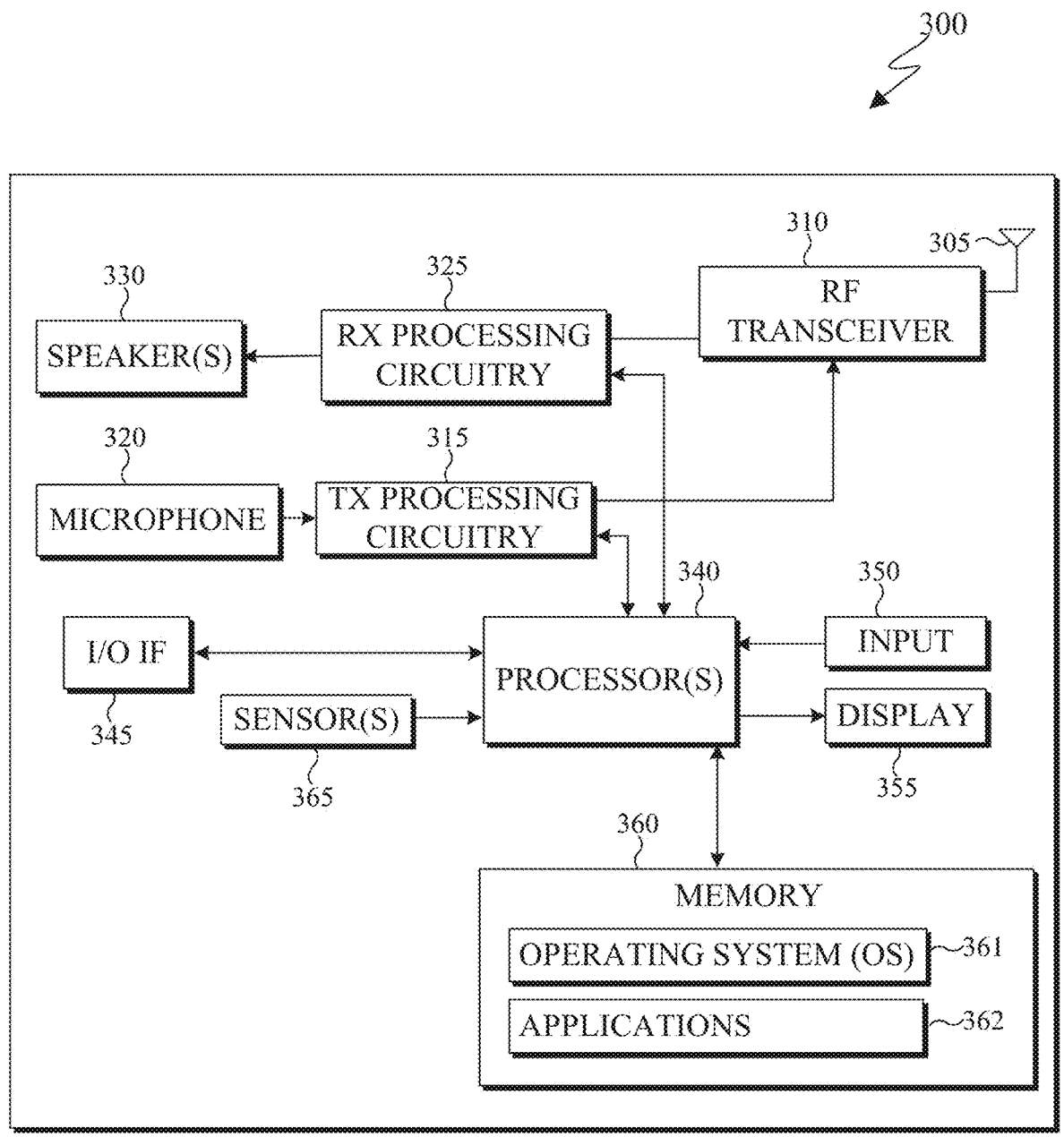

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 includes a bus system 205 that supports communication between at least one processing device (such as a processor 210), at least one storage device 215, at least one communications interface 220, and at least one input/output (I/O) unit 225. The server 200 can represent one or more local servers, one or more compression servers, or one or more encoding servers, such as an encoder. In certain embodiments, the encoder can perform decoding. The server 200 can be located in a core network or an edge network.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can provision a number of nodes in a core network and an edge network.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for decomposing a point cloud into patches, instructions for packing the patches on two-dimensional (2D) frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image, or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

The electronic device 300 can create media content such as generate a virtual object or capture (or record) content through a camera. To transmit the media content to another device, the electronic device 300 can compress and encode the content. When preparing the media content to be transmitted, the electronic device 300 can project the point cloud into multiple patches. For example, a cluster of points of the point cloud can be grouped together and depicted as a patch in a 2D frame. A patch can represent a single attribute of the point cloud, such as geometry, color, and the like. Patches that represent the same attribute can be packed into individual 2D frames, respectively.

The 2D frames are then encoded to generate a bitstream. The frames can be encoded individually or together. During the encoding process additional content such as metadata, flags, occupancy maps, auxiliary information, and the like can be included in the bitstream. The electronic device 300 can encode the media content to generate a bitstream, such that the bitstream can be transmitted directly to another electronic device or indirectly such as through the network 102 of FIG. 1. Another electronic device, similar to the electronic device 300, can receive a bitstream directly from the electronic device 300 or indirectly such as through the network 102 of FIG. 1.

Similarly, when decoding media content included in a bitstream that represents a 3D point cloud, the electronic device 300 decodes the received bitstream into frames. In certain embodiments, the decoded bitstream also includes an occupancy map. The decoded bitstream can also include one or more flags, or quantization parameter size, auxiliary information, or any combination thereof. A geometry frame can include pixels that indicate geographic coordinates of points of the point cloud in 3D space. Similarly, a color frame can include pixels that indicate the RGB color of each geometric point in 3D space. In certain embodiments, an individual frame can include points from different layers. In certain embodiments, after reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
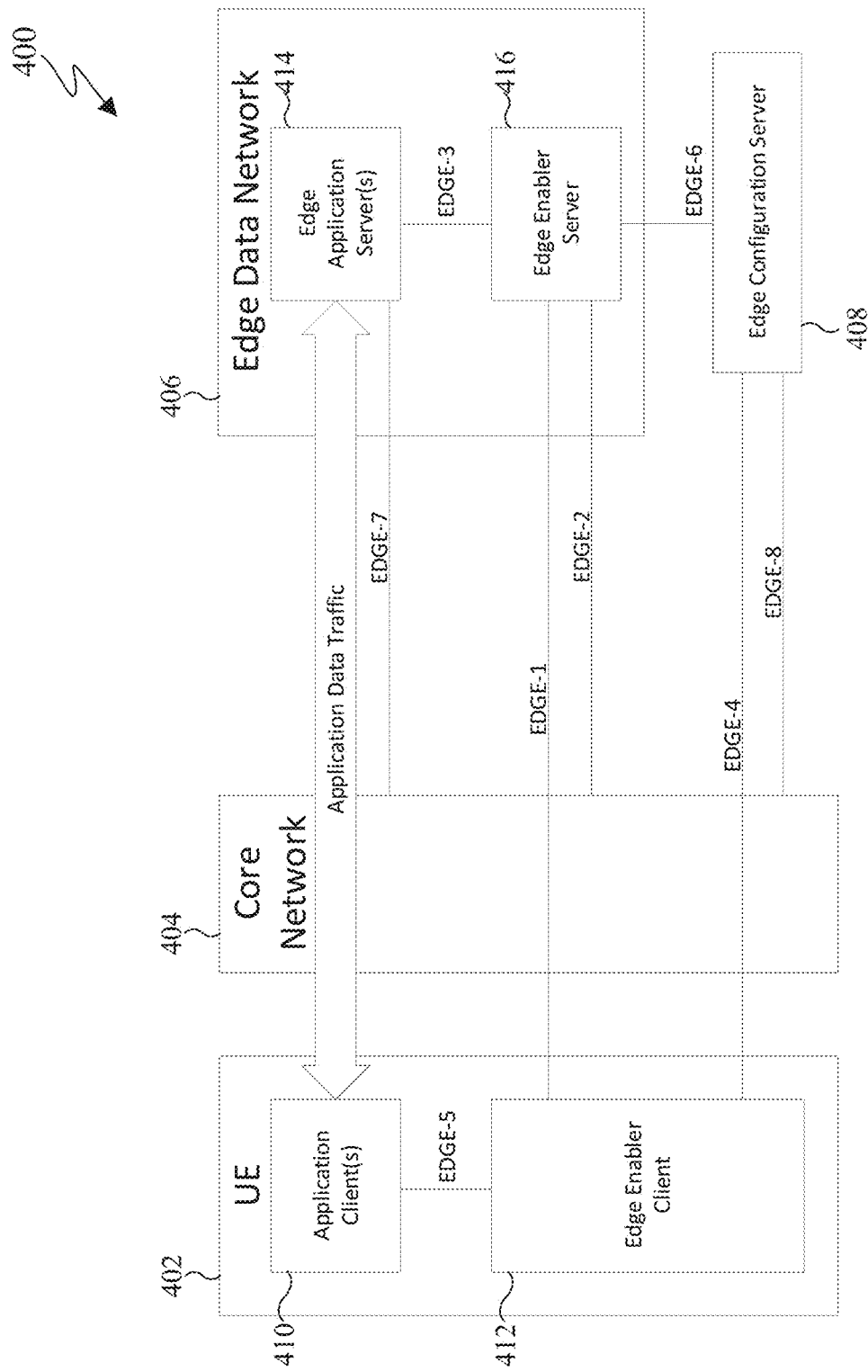
FIG. 4 illustrates an example architecture for enabling edge application in accordance with this disclosure.

FIG. 4 illustrates an example architecture 400 for enabling edge application in accordance with this disclosure. The embodiment of the edge application architecture 400 illustrated in FIG. 4 is for illustration only. FIG. 4 does not limit the scope of this disclosure to any particular implementation of an electronic device.

Volumetric content services are future media services that require enormous amount of processing (compute capacity) and bandwidth for transmission. However, media processing of volumetric content may not be possible in some of today's mobile terminals. 5G networks offer enough bandwidth to provide some volumetric services to end users. As a result, network processing of volumetric content is required before the final volumetric content is sent to users for consumption. Edge processing helps with such a requirement.

A number of sub-working groups in 3GPP have either studied or currently studying edge deployment as an enabler for providing services to end users that were other difficult to offer due to latency and buffering requirements. A working group is currently standardizing an application layer architecture for enabling edge applications as shown in FIG. 4.

As shown in FIG. 4, the edge application architecture 400 includes network components 402-408 and interfaces 410-416 between those network components that can offer edge-based applications. The network components 402-408 can include a user equipment (UE) 402, a core network 404, an edge network 406, and an edge configuration server (ECS) 408. The interfaces 410-416 can include an application client 410, an edge enabler client 412, an edge application server 414, and an edge enabler server (EES) 416.

The UE 402 is a device that generates volumetric content related to a user and transmits the volumetric content to the edge network. The UE 402 receives mixed volumetric content of other users in a conference setting and renders the volumetric content in the conference setting. The UE 402 can include the application client 410 and the edge enabler client 412.

The core network 404 can assign the UE 402 to a specific node in the edge network 406. The core network 404 can direct volumetric content from the UE 402 and other UE to an edge network 406.

The edge network 406 can include media resource functions that operate to process and mix the volumetric content from the UE 402 and mix the content of other UE into a conference scene that is provided back to the UE 402. The edge network 406 can include the edge application server 414 and the EES 416.

The ECS 408 is a configuration server deployed in the edge network 406 to offer services to edge enabler client 412 to discover the appropriate EES 416 and edge application servers 414. The ECS 408 provides supporting functions needed for the edge enabler client 412 to connect with an EES 416. The ECS 408 can provision of Edge configuration information to the edge enabler client 412. The configuration information can include information for the edge enabler client 412 to connect to the EES 416 and information for establishing a connection with EES s 416. The ECS 408 can support the functionalities of registration (i.e., registration, update, and de-registration) for the EES(s) 416.

The application client 410 is a client at the UE 402 (e.g., an app) that the service provider requires the users to have to use the service. The application client 410 is the application resident in the UE 402 performing client function(s).

The edge enabler client 412 is a client at the UE 402 that interfaces with services deployed at the mobile operator edge to provide required data to the application client 410. The edge enabler client 412 abstracts the delivery of data to the application client 410, so the application client 410 does not know whether the data is being retrieved through edge network 406, core network 404, or service provider network. The edge enabler client 412 can retrieve and provision configuration information to enable the exchange of application data traffic with the edge application server 414.

The edge application server 414 is an application server deployed in the edge network 406 for the mobile operator. The edge application server 414 is the application server resident in the edge network 406, performing the server functions. The application client 410 of UE 402 can connect to the edge application server 414 in order to avail the services of the application with the benefits of edge computing.

The EES 416 provides supporting functions to enable exchange of traffic between edge enabler client 412 and edge application server 414. Such functions include discovery of edge application server 414, connection management between edge enabler client 412, ECS 408, and edge application servers 414.

The EES 416 can provision configuration information to the edge enabler client 421, enabling exchange of application data traffic with the edge application server 414. The EES 416 can interact with 3GPP core network 404 for accessing the capabilities of network functions. The EES 416 can support external exposure of 3GPP network and service capabilities to the edge application server(s) 414; support functionalities of registration (i.e., registration, update, and de-registration) for the edge enabler client(s) 412 and the edge application server(s) 414; and support the functionalities of triggering the edge application server 414 instantiation on demand.

Although FIG. 4 illustrates an edge application architecture 400 for enabling edge application, various changes may be made to FIG. 4. For example, the edge application architecture 400 and its individual components can vary as needed or desired. Also, the number and placement of various components of the edge application architecture 400 can vary as needed or desired. In addition, the edge application architecture 400 may be used in any other suitable volumetric conferencing process and is not limited to the specific processes described above.

Figure 5:
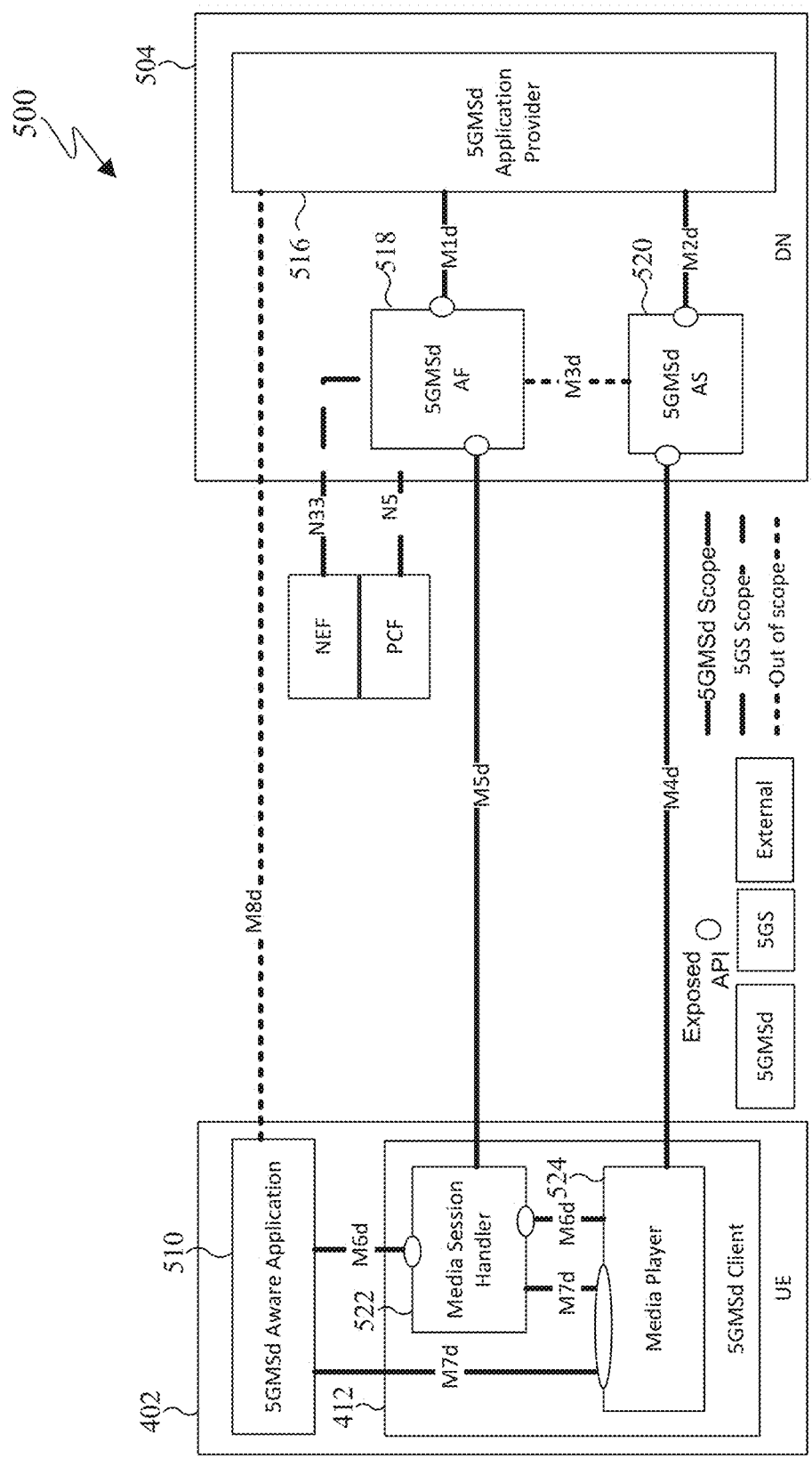
FIG. 5 illustrates an example architecture for media streaming in accordance with this disclosure.

FIG. 5 illustrates an example architecture 500 for media streaming in accordance with this disclosure. The embodiment of the media streaming architecture 500 illustrated in FIG. 5 is for illustration only. FIG. 5 does not limit the scope of this disclosure to any particular implementation of an electronic device.

5G media streaming is enabled by setting up application functions in a core network 404. A signaling application function 518 that performs signaling function(s) and a media application function 520 that performs media functions. There can be multiple instances of these application functions the core network 404 depending upon application requirements. Different components of UE 402 connect to these application functions to exchange signaling and media data to receive the 5G media streaming service offered by the mobile operator.

As shown in FIG. 5, 3GPP TS 26.512 specifies reference for media streaming architecture 500 for 5G media streaming (5GMS). 3GPP SA working group (WG) 4 (WG4) is standardizing media services for deployment in a 5G network. Different system components for 5G media streaming architecture 500 can include a UE 402 and a data network 504. The UE 402 can include a 5GMSd aware application 510, and an edge enabler client 412 (5GMSd client). The data network 504 can include an application provider 514 (5GMSd application provider), a signaling media function 518 (5GMSd AF), and a 5GMSd (processing media function) 520. The 5GMSd client 512 can include a media session handler 522 and a media player 524. The 5GMSd client 512 can correspond to the edge enabler client 412 shown in FIG. 4.

The aware application 510 is stored in the UE 402. The aware application 510 receives application service information from the application provider. The application service information is then used for retrieving information and data related to that application from the data network. The aware application 510 can correspond to the application client 410 shown in FIG. 4.

The signaling media function 518 is a function in a data network 504 that performs signaling functions of the application service. The signaling media function 518 provides various control functions to the media session handler on the UE 402 and/or the 5GMSd application provider. The signaling media function 518 may relay or initiate a request for different policy or charging function (PCF) treatment or interact with other network functions.

The media server 520 is an application server that hosts media functions. The media server 520 is dedicated to media streaming. The media server 520 can stream volumetric media to the UE 402.

The media session handler 522 is a component of the UE 402 that enables communication with signaling media function 518 in the data network 504. The communications with the signaling media function 518 are for setting up the relevant media channels between the UE 402 and the data network 504.

The media player 524 is a component of the UE 402. The media player 524 can receive media data from the media application function in the data network 504. The media player 524 can provide data to the 5GMSd aware application 510.

Although FIG. 5 illustrates a media streaming architecture 500, various changes may be made to FIG. 5. For example, the media streaming architecture 500 and its individual components can vary as needed or desired. Also, the number and placement of various components of the media streaming architecture 500 can vary as needed or desired. In addition, the media streaming architecture 500 may be used in any other suitable media streaming process and is not limited to the specific processes described above.

Figure 6:
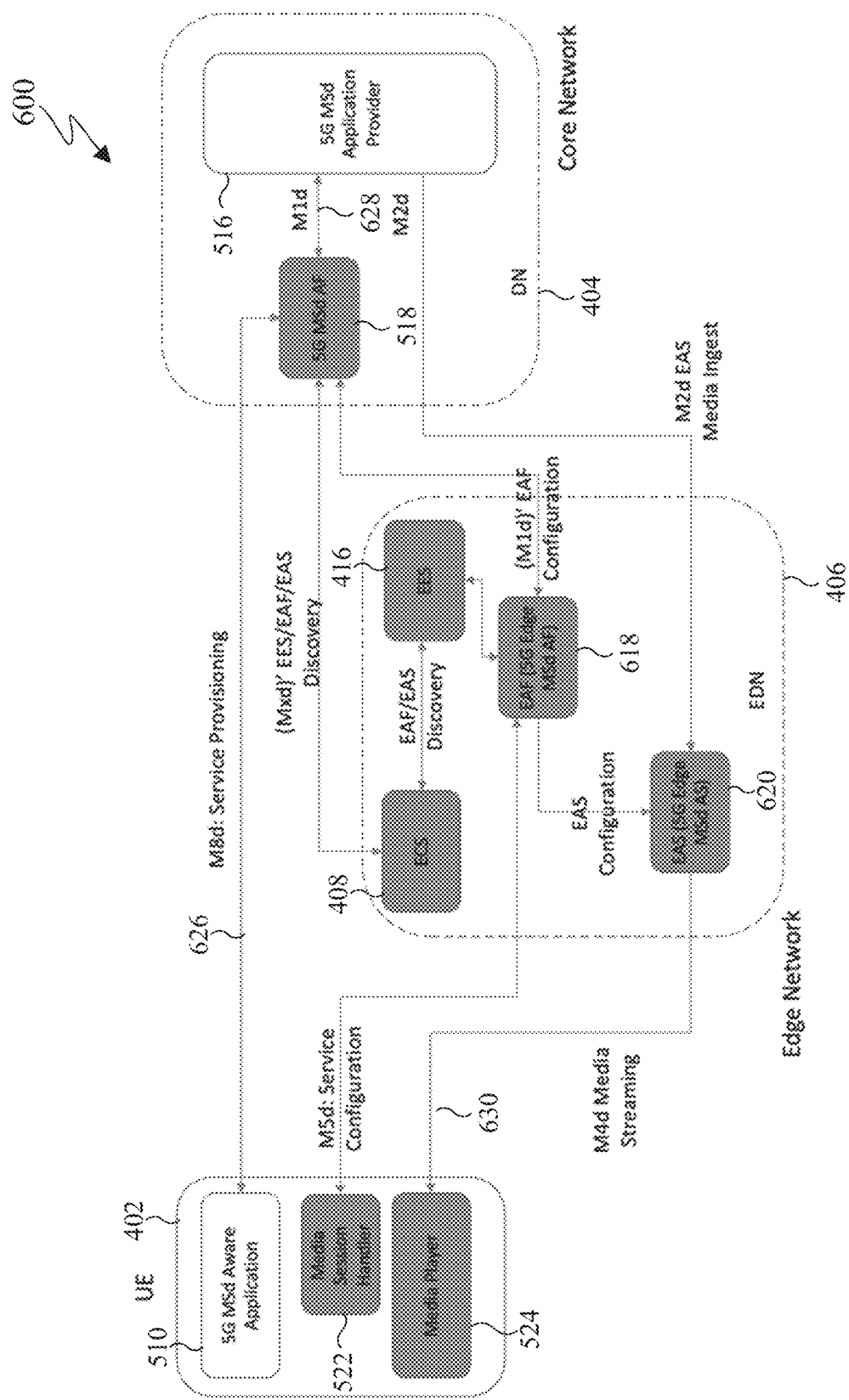
FIG. 6 illustrates a downlink media distribution architecture using edge network in accordance with this disclosure.

FIG. 6 illustrates a downlink media distribution architecture 600 using an edge network 406 in accordance with this disclosure. The embodiment of the media distribution architecture 600 illustrated in FIG. 6 is for illustration only. FIG. 6 does not limit the scope of this disclosure to any particular implementation of an electronic device.

As shown in FIG. 6, an edge network 406 can be used by downlink media distribution architecture 600. An application provider 516 sets up a signaling media function 518 (5GMSd AF) for signaling communication with edge enabler clients 412 in the UE 402. The signaling application function 518 passes on service access information to the aware application 510 in the UE 402 (using M8d service provisioning interface 626). The signaling application function 518 communicates with the ECS 408 in the edge network 406 for discovery of an appropriate EES 416. The EES 416 discovers an appropriate edge signaling application function 618 in the edge network 406. The signaling application function 518 in the core network 404 requests setup of an edge media application function 620 (5G MSd AS) in the edge network 406. The edge signaling application function 618 and edge media application function 620 in the edge network 406 jointly provide downlink streaming of media content from application provider 516 to the UEs 402.

Although FIG. 6 illustrates a media distribution architecture 600, various changes may be made to FIG. 6. For example, the media distribution architecture 600 and its individual components can vary as needed or desired. Also, the number and placement of various components of the media distribution architecture 600 can vary as needed or desired. In addition, the media distribution architecture 600 may be used in any other suitable media distribution process and is not limited to the specific processes described above.

Figure 7:
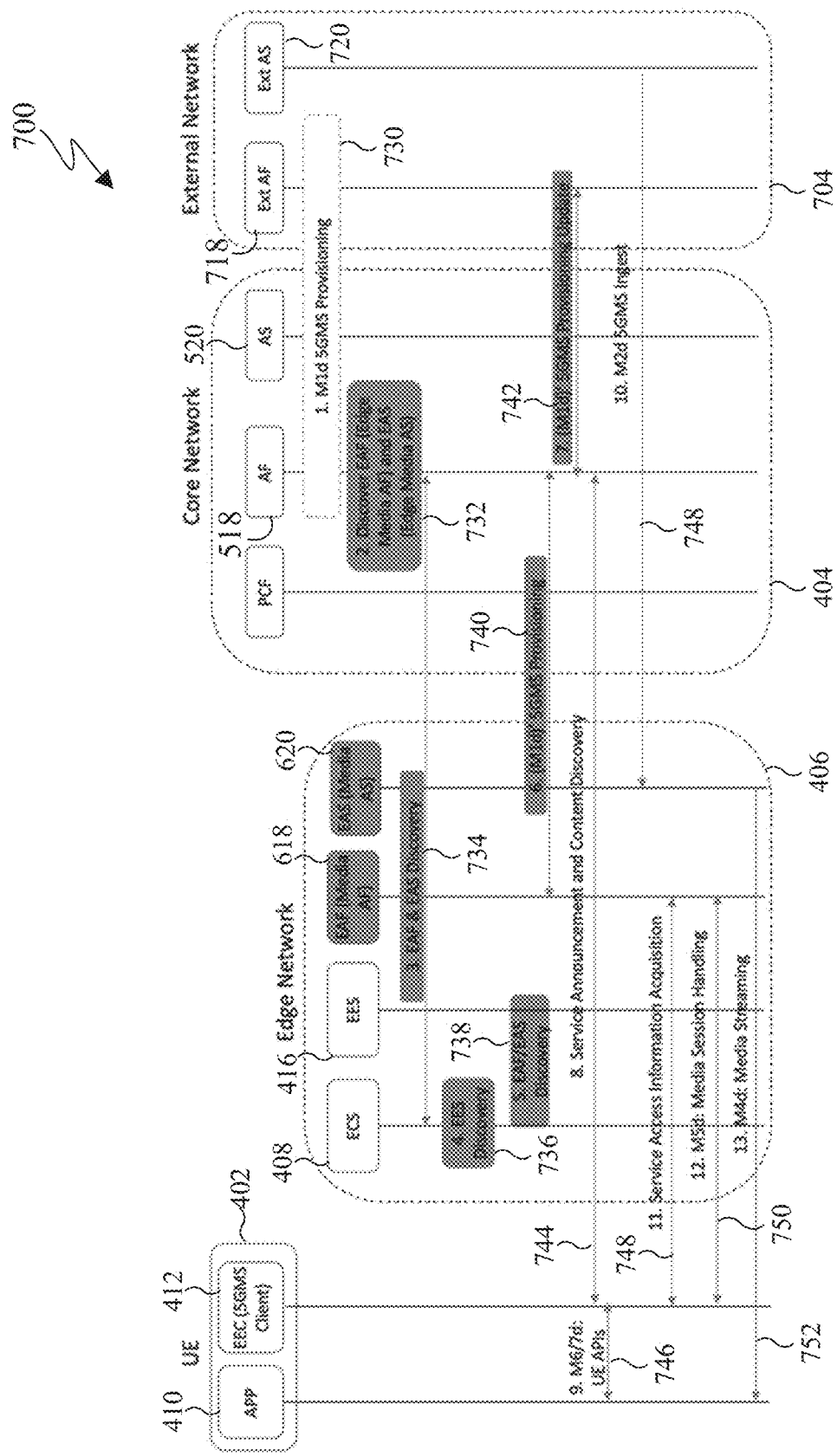
FIG. 7 illustrates a high-level procedure for downlink media distribution streaming using edge network in accordance with this disclosure.

FIG. 7 illustrates a high-level procedure 700 for downlink media distribution streaming using edge network 406 in accordance with this disclosure. The embodiment of the downlink media distribution streaming using an edge network procedure 700 illustrated in FIG. 7 is for illustration only. FIG. 7 does not limit the scope of this disclosure to any particular implementation of an electronic device.

As shown in FIG. 7, a high-level procedure 700 can use an edge network 406 for downlink media streaming. An external signaling application function 718 in external service provider (5G MSd application provider) network 704 provisions a signaling application function 518 (5G MSd AF) in the operator core network 404 and configures the signaling application function 518 using an M1d interface 628, in step 730. The M1d interface 628 is specified in 3GPP TS 26501 and 3GPP TS 26512. The configuration involves the external application provider 516 to use edge network 406 for media distribution delivery. After configuration, the signaling application function 518 in core network 404 is ready for providing downlink media distribution using edge network 406. In step 732, the signaling application function 518 (5GMSd AF) discovers the appropriate ECS 408 and EES 416 servers in the edge network 406 as specified in 3GPP TS 23558.

In step 734, the signaling application function 518 in core network 404 communicates with the ECS 408 to find the appropriate EES 416. In step, 736, the ECS 408 in the edge network 406 discovers and provides access to the appropriate EES 416 in the edge network 406. In step 738, the EES 416 discovers the appropriate edge signaling application function 618 in the edge network 406.

In step 740, the signaling application function 518 (5G MSd AF) in the core network 404 configures the edge signaling application function 618 in the edge network 406 using a modified M1d (M1d) interface. The signaling application function 518 in core network 404 also provisions an edge media application function 620 (5G AS) in the edge network 406 for providing media functionalities. In step 742, the signaling application function 518 in core network 404 informs the external media application function 720 in the external application provider network 704 to ingest content into the edge media server.

In step 744, the signaling application function 518 in core network 404 uses the service provisioning interface 626 (M8d interface) to send service access information to the UE 402 as described in 3GPP TS 26512. In step 746, the EEC 412 in the UE 402 configures other components in the UE 402 (e.g., the media player 524, app, etc.) using the received service access information. In step 748, media content is ingested from the external service provider network 704 into the edge media application function 620 (media AS) in the edge network 406.

In step 748, the EEC 412, acting as a media session handler, acquires service access information from the edge signaling application function 618 (edge media AF). In step 750, media session handling is performed between the edge signaling application function 518 in edge network 406 and the EEC 412 (media session handler) in the UE 402. In step 752, media content is distributed to UE 402 using the M4d interface 630 from the edge media application function 620 (5G edge AS) using the M4d interface 630. The M4d interface 630 is specified in 3GPP TS 26512.

Although FIG. 7 illustrates a downlink media distribution streaming using edge network procedure 700, various changes may be made to FIG. 7. For example, the downlink media distribution streaming using edge network procedure 700 and its individual components can vary as needed or desired. Also, the number and placement of various components involved in the downlink media distribution streaming using edge network procedure 700 can vary as needed or desired.

Figure 8:
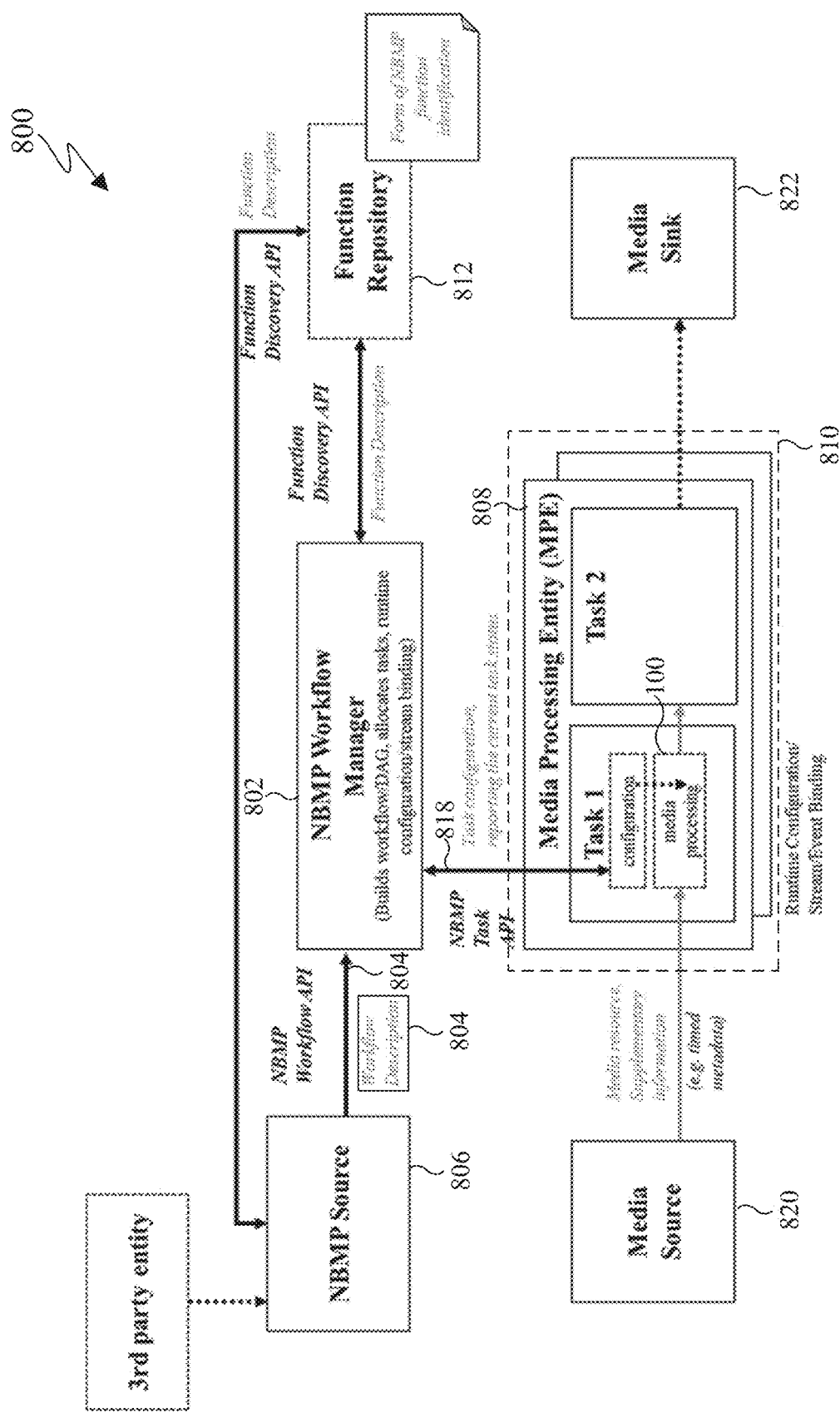
FIG. 8 illustrates a network-based media processing (NBMP) reference architecture in accordance with this disclosure.

FIG. 8 illustrates a network-based media processing (NBMP) reference architecture 800 in accordance with this disclosure. The embodiment of the NBMP reference architecture 800 illustrated in FIG. 8 is for illustration only. FIG. 8 does not limit the scope of this disclosure to any particular implementation of an electronic device.

As shown in FIG. 8, the central part of the NBMP architecture 800 is an entity called the NBMP workflow manager 802, that receives a processing document (called a "workflow description" document 804) from an NBMP source 806 and sets up one or more media processing entities 808 (MPEs) in the network/cloud as a media processing workflow 810. The workflow description document 804 is sent from the NBMP source 806 to the workflow manager 802 using an NBMP workflow API 812.

The workflow manager 802, then reads a database of function descriptions, called a function repository 814, to choose one or more media processing functions 816 that have to be run in one or more MPEs 808. The workflow manager 802 chooses what media processing functions 816 to run in which MPEs 808 and configures each of those MPEs 808 using the chosen media processing functions 816. The media processing functions 816 are run as media processing tasks inside the MPEs 808. The configuration of media processing tasks is done by the workflow manager 802 using the task API 818.

The workflow manager 802 informs the NBMP source 806 of the media/metadata ingestion information, which is then used by the media source 820 to ingest content into the network/cloud media processing workflow. The final result of media processing in the network/cloud is then sent to one or more media sinks 822 using standard streaming technologies and formats.

Although FIG. 8 illustrates a NBMP reference architecture 800, various changes may be made to FIG. 8. For example, the NBMP reference architecture 800 and its individual components can vary as needed or desired. Also, the number and placement of various components of the NBMP reference architecture 800 can vary as needed or desired. In addition, the NBMP reference architecture 800 may be used in any other suitable media streaming process and is not limited to the specific processes described above.

Figure 9:
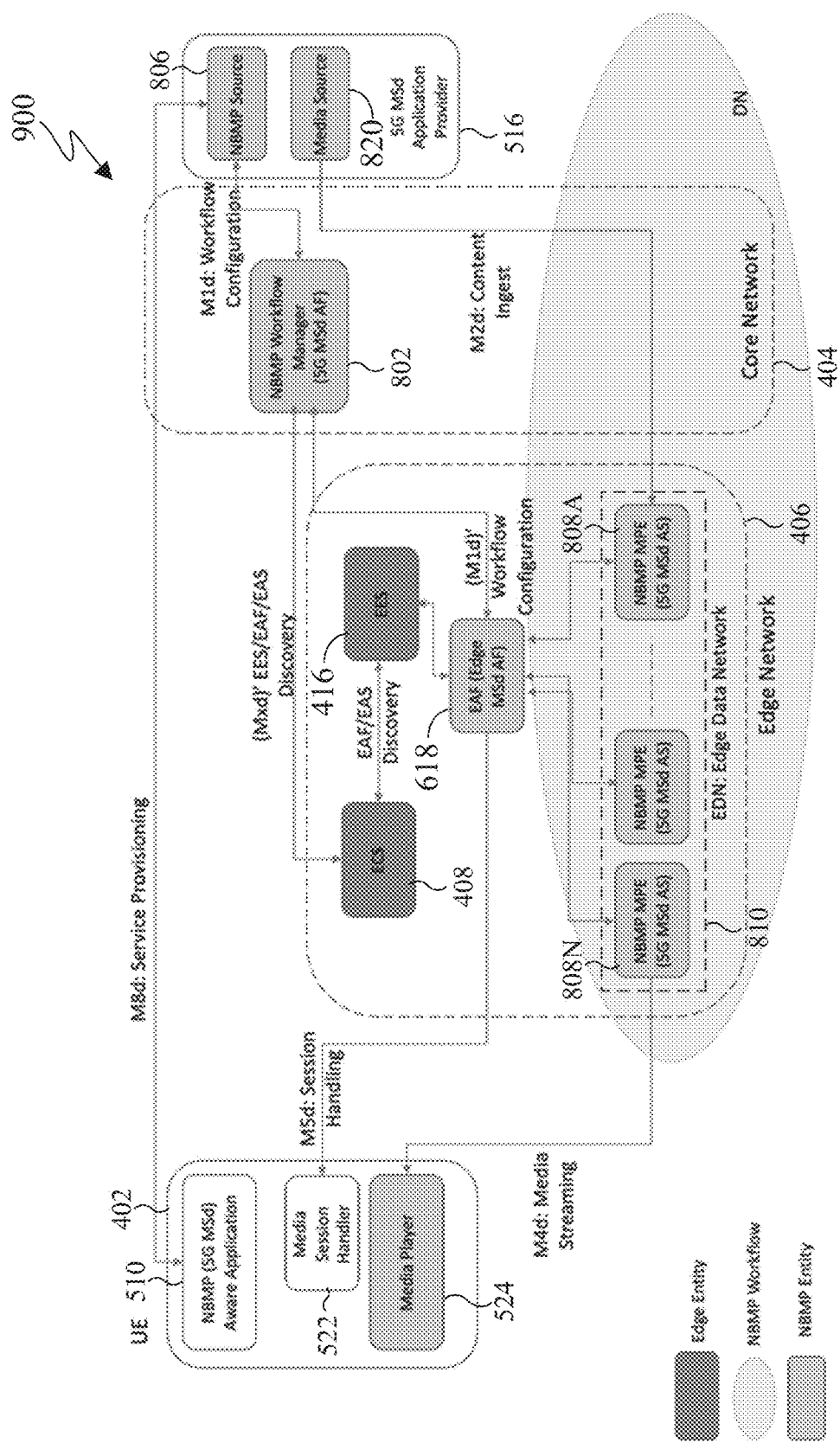
FIG. 9 illustrates a media streaming architecture with an NBMP on top of an edge network in accordance with this disclosure.

FIG. 9 illustrates a media streaming architecture 900 with an NBMP on top of an edge network 406 in accordance with this disclosure. The embodiment of the media streaming architecture 900 illustrated in FIG. 9 is for illustration only. FIG. 9 does not limit the scope of this disclosure to any particular implementation of an electronic device.

In order to deploy an NBMP enabler on top of an edge network 406, an external signaling application function 718 in the external service provider network 704 requests setting up a media processing workflow 810 in the media edge network 406 by requesting a signaling application function 518 inside the core network 404 acting as an NBMP workflow manager 802. The NBMP workflow manager 802 sets up MPEs 808 in the edge network 406. The MPEs 808 in the edge network 406 process the media content and forwards the final resultant media to the intended users. The NBMP enabler described above can be deployed on top of 5G edge network 406 for an example media streaming service.

As shown in FIG. 9, an NBMP architecture 800 can be deployed on top of an edge network 406. The procedure to setup NBMP media processing workflow 810 in the edge network 406 and send final resultant media to UE 402 can include an NBMP source 806 in the external service provider network 704 configures a signaling application function 518 (5G MSd AF) in the core network 404. This signaling application function 518 in the core network 404 assumes the role of NBMP workflow manager 802 as defined in MPEG ISO/IEC 23090-8.

The signaling application function 518 in the core network 404 acting as the NBMP workflow manager 802 creates an edge signaling application function 618 in the edge network 406 similar to the procedure described relation to FIG. 6.

The edge signaling application function 618 in the edge network 406 is then configured by the signaling application function 518 in the core network 404 about workflow processing details. The role of NBMP workflow manager 802 status is assumed by the edge signaling application function 618 in the edge network 406 after receiving the workflow processing details from the signaling application function 518 in the core network 404.

The edge signaling application function 618 in the edge network 406, assuming the role of NBMP workflow manager, deploys one or more NBMP MPEs 808 (described in ISO/IEC 23090-8) in the edge network 406 to create an NBMP workflow 810. Each of these MPEs are setup as edge media application functions 720 (5G AS functions) in the edge network 406. Content is ingested from media source 820 in the external service provider network 704 into the first MPE 808A in the edge network 406. All the MPEs 808A-808N in the edge network 406 process the received media content as described in ISO/IEC 23090-8. The final MPE 808N in the NBMP workflow 810 takes the responsibility of distributing the processing media content in the NBMP workflow 810 in the edge network 406 to the UE 402. The final MPE 808N in the workflow, capable of downlink distribution, distributes the final resultant content to the UE 402.

Although FIG. 9 illustrates a media streaming architecture 900, various changes may be made to FIG. 9. For example, the media streaming architecture 900 and its individual components can vary as needed or desired. Also, the number and placement of various components of the media streaming architecture 900 can vary as needed or desired. In addition, the media streaming architecture 900 may be used in any other suitable media streaming process and is not limited to the specific processes described above.

Figure 10:
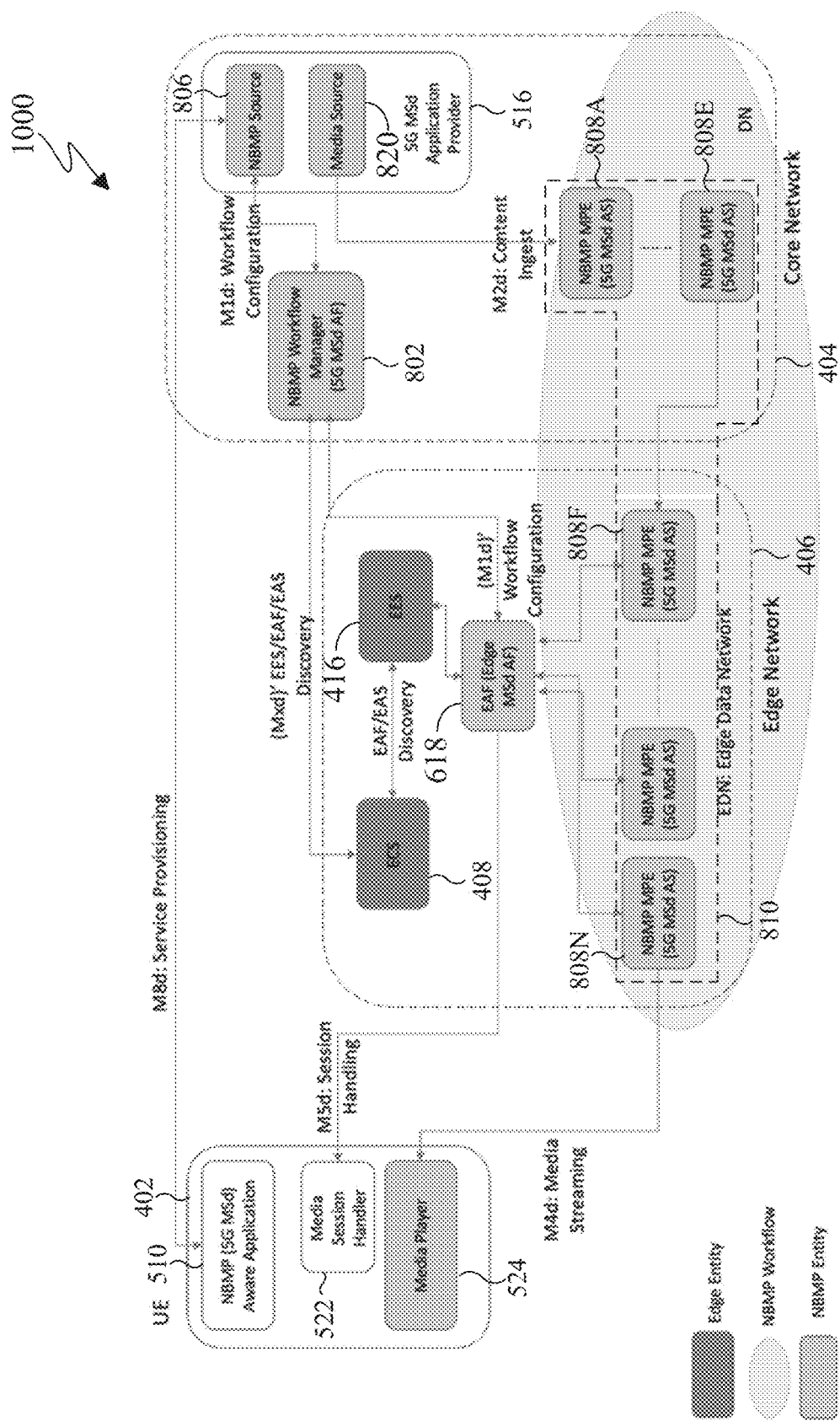
FIG. 10 illustrates a media streaming architecture with an NBMP on top of a core network and an edge network in accordance with this disclosure.

FIG. 10 illustrates a media streaming architecture 1000 with an NBMP on top of a core network and an edge network 406 in accordance with this disclosure. The embodiment of the media streaming architecture 1000 illustrated in FIG. 10 is for illustration only. FIG. 10 does not limit the scope of this disclosure to any particular implementation of an electronic device.

As shown in FIG. 10, network processing using NBMP can be deployed both in the core network 404 and the edge network 406. Other media services can be offered with similar architectures. As shown in the figure, some MPEs 808 of the NBMP workflow 810 can be setup as media application functions 520 (5G AS servers) in the core network 404 and the remaining MPEs 808 as edge media application functions 620 (5G AS servers) in the edge network 406. A first MPE 808A in the set of MPEs 808 deployed in the core network 404 ingests content from the media source 820 in the external service application provider 516. The media gets processed in the core network 404 and sent to the MPEs 808 deployed in the edge network 406 for further processing. Once this media data or metadata reaches the first MPE 808 in the edge network 406, the processing in the set of MPEs 808 in the edge network 406 happens as described in relation to FIG. 9.

In certain embodiments an NBMP workflow 810 can be set up across a core network 404 and an edge network 406 and send final resultant media to the UE 402. An NBMP source 806 in the external service provider network 704 configures a signaling application function 518 (5G MSd AF) in the core network 404. The signaling application function 518 configured in the core network 404 assumes the role of NBMP workflow manager 802 as defined in MPEG ISO/IEC 23090-8. The signaling application function 518 (5GMSd AF) in the core network 404 acting as the NBMP workflow manager 802 creates an edge signaling application function 618 in the edge network 406.

The edge signaling application function 618 in the edge network 406 is configured by the signaling application function 518 in the core network 404 about workflow processing details. However, these details pertain to the set of MPEs 808 to be deployed in the edge network 406. From now on, the edge signaling application function 618 in the edge network 406 assumes the role of NBMP workflow manager 802 for MPEs 808 in the edge network 406. The signaling application function 618 remains the NBMP workflow manage 802 for MPEs 808 in the core network 404

The signaling application function 518 in the core network 404 assumes the role of NBMP workflow manager 802 for MPEs 808 in the core network 404 and deploys one or more NBMP MPEs 808 (described in ISO/IEC 23090-8) in the core network 404 to create a partial NBMP workflow 810. Each of these MPEs 808A-808E are setup as media application functions 520 (5G AS) in the core network 404. The final MPE 808E in the NBMP workflow of the core network 404 takes the responsibility of distributing the processing media content to the first MPE 808F in the edge network 406.

Similarly, the application function in the edge network 406 assuming the role of NBMP workflow manager for the edge network 406 deploys one or more NBMP MPEs (described in ISO/IEC 23090-8) in the edge network 406 to create an NBMP workflow 810. Each of these MPEs 808F-808N are setup as edge media application functions 620 (5G AS) in the edge network 406. The final MPE in the NBMP workflow takes the responsibility of distributing the processing media content in the edge workflow to the intended recipient.

Content is ingested from media source 820 in external service provider network 704 into the first MPE 808A in the core network 404. The MPEs 808A-808E in the core network 404 process the received media content as described in ISO/IEC 23090-8, and send the media data/metadata to the MPEs 808F-808N in the edge network 406 for further processing. The MPEs 808F-808N in the edge network 406 process the incoming media data/metadata from the MPEs 808A-808E in the core network 404 to complete the processing. The final MPE 808N in the edge network 406 part of the NBMP workflow 810 is capable of downlink distribution to distribute the final resultant media content to the UE 402.

Although FIG. 10 illustrates a media streaming architecture 1000, various changes may be made to FIG. 10. For example, the media streaming architecture 1000 and its individual components can vary as needed or desired. Also, the number and placement of various components of the media streaming architecture 1000 can vary as needed or desired. In addition, the media streaming architecture 1000 may be used in any other suitable media streaming process and is not limited to the specific processes described above.

Figure 11:
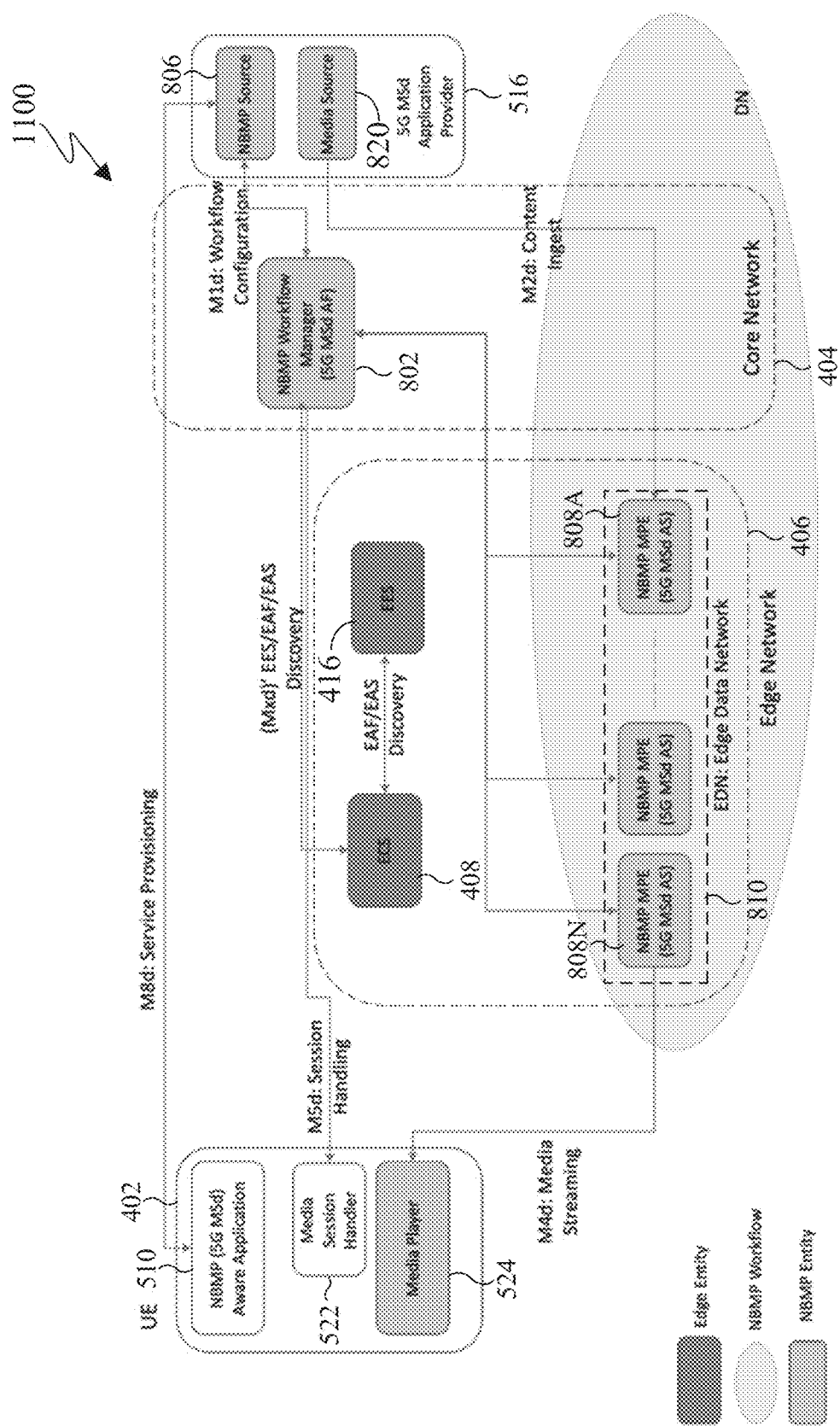
FIG. 11 illustrates a media streaming architecture with workflow management in the edge network without edge workflow manager in accordance with this disclosure.

FIG. 11 illustrates a media streaming architecture 1100 with workflow management in the edge network 406 without edge workflow manager in accordance with this disclosure. The embodiment of media streaming architecture 1100 illustrated in FIG. 11 is for illustration only. FIG. 11 does not limit the scope of this disclosure to any particular implementation of an electronic device.

As shown in FIG. 11, An NBMP workflow 810 in an edge network 406 can be controlled by a NBMP workflow manager 802 in the core network 404. In certain embodiments, there is not an edge signaling application function 618 in the edge network 406 that assumes the NBMP workflow manager 802 for the edge media application functions 620 acting as MPEs 808 in the edge network 406. All NBMP MPEs 808 in the edge network 406 are configured directly from the NBMP workflow manager 810 in the core network 404. The workflow manager 802 can control the media processing through the MPEs 808 in the media processing workflow 810 from the core network 404.

Although FIG. 11 illustrates a media streaming architecture 1100, various changes may be made to FIG. 11. For example, the media streaming architecture 1100 and its individual components can vary as needed or desired. Also, the number and placement of various components of the media streaming architecture 1100 can vary as needed or desired. In addition, the media streaming architecture 1100 may be used in any other suitable media streaming process and is not limited to the specific processes described above.

Figure 12:
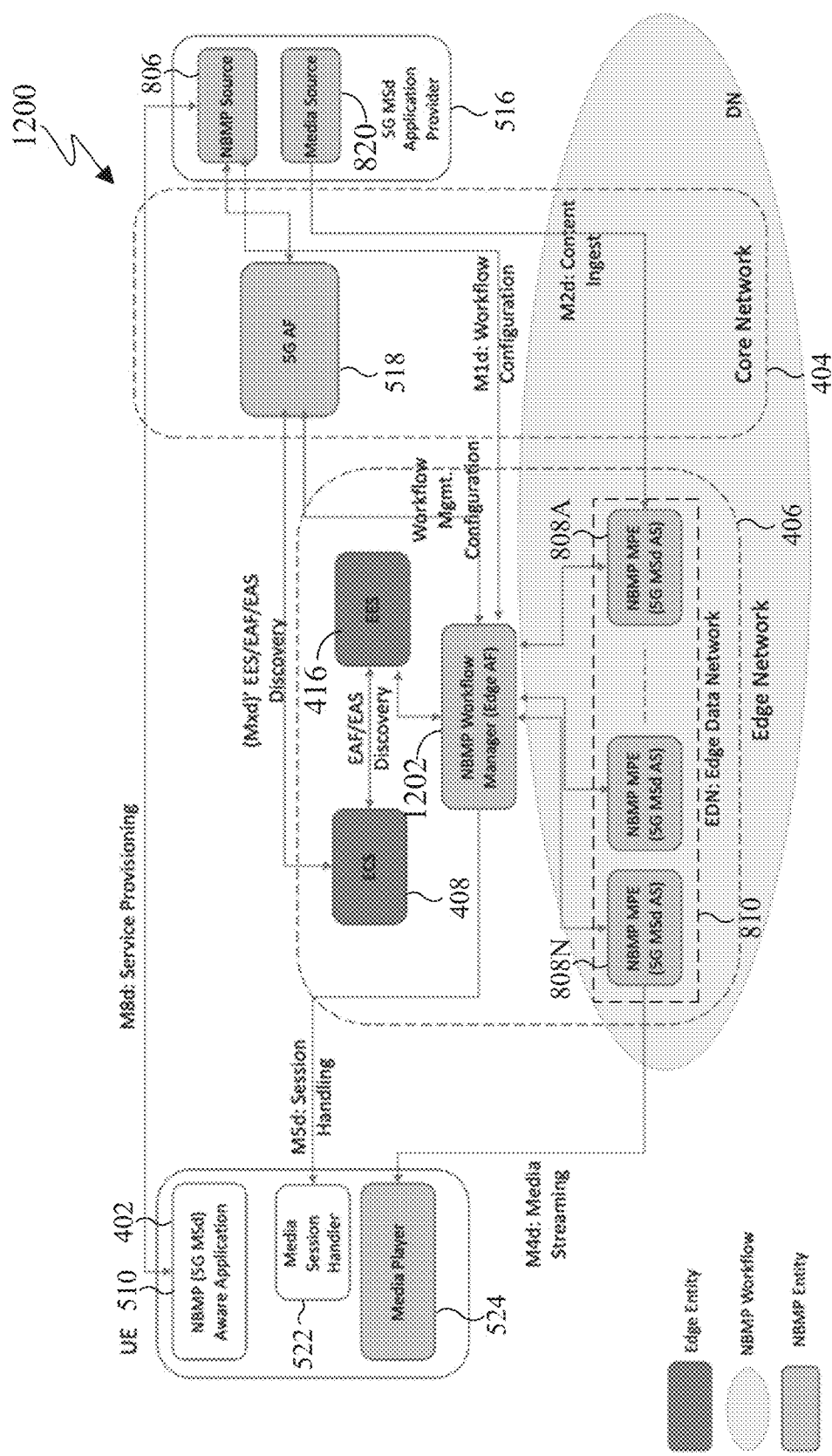
FIG. 12 illustrates a media streaming architecture with an NBMP workflow manager in an edge network with direct interface to an external application provider in accordance with this disclosure.

FIG. 12 illustrates a media streaming architecture 1200 with an NBMP workflow manager in an edge network 406 with direct interface to an external application provider in accordance with this disclosure. The embodiment of the media streaming architecture 1200 illustrated in FIG. 12 is for illustration only. FIG. 12 does not limit the scope of this disclosure to any particular implementation of an electronic device.

Previously, an NBMP source 806 in external service provider network 704 configures a signaling application function 518 in the core network 404, which acts as the NBMP workflow manager 802 as described in ISO/IEC 23090-8. The signaling application function 518 then configures an edge signaling application function 618 in the edge network 406 to act as the NBMP workflow manager 802 for managing the MPEs 808 deployed in the edge network 406.

In some embodiments, the signaling application function 518 in the core network 404 is a simple application function without NBMP workflow manager capabilities. The NBMP source 806 in the external service provider network 704 can direct configure the edge signaling application function 618 in the edge network 406 and request the edge signaling application function 618 to act as the NBMP workflow manager 802 for managing MPEs 808 in the edge network 406.

As shown in FIG. 12, the media streaming architecture 1100 provides for an NBMP workflow manager 802 in the edge network 406 that is directly configured by an NBMP source 806 in external service provider network 704. An NBMP source 806 in the external service provider network 704 configures a signaling application function 518 (5g MSd AF) in the core network 404 and requests services of an edge NBMP workflow manager 1202 in edge network 406. The signaling application function 518 (5G AF) in the core network 404 discovers an edge application server 414 as described in 3GPP TS 23558. These application servers 414 in the edge network 406 can assume the role of edge NBMP workflow manager 1202 as defined in MPEG ISO/IEC 23090-8.

The signaling application function 518 (5G AF) in core network 404 informs the external NBMP source 806 about the entry point for information of the edge network workflow manager 1202. The entry point information includes the location and identity of the edge NBMP workflow manager 1202 in edge network 406. The edge NBMP workflow manager 1202 in the edge network 406 is then configured by the external NBMP source 806 about workflow processing details as described in ISO/IEC 23090-8.

The signaling application function 618 in the edge network 406 assuming the role of edge NBMP workflow manager 1202 deploys one or more NBMP MPEs 808A-808N (described in ISO/IEC 23090-8) in the edge network 406 to create an NBMP workflow 810. Each of these MPEs 808A-808N are setup as edge media application functions 620 (5G AS) in the edge network 406. The final MPE 808N in the NBMP workflow 810 takes the responsibility of distributing the processed media content in the NBMP workflow 810 to the UE 402.

Content is ingested from media source 820 in external service provider network 704 into the first MPE 808A in the edge network 406. The MPEs 808A-808N in the edge network 406 process the received media content as described in ISO/IEC 23090-8. The final MPE 808N in the NBMP workflow 810, capable of downlink distribution (5GMSde AS), distributes the final resultant content to the UE 402.

In earlier embodiments, procedures are described where the external service provider network 704 is aware of an operator edge network 406, and therefore can request deployment of service delivery nodes at required locations of the operator edge network 406. In other embodiments, the external service provider network 704 is unaware of such capabilities in the operator edge network 406. The external service provider network 704 can pass on the workflow details and a set of service requirements such as the following to the signaling application function 518 in the core network 404.

Service requirements can include Quality of Service (QoS) requirements for edge deployment, hardware requirements, and security requirements. QOS requirements for edge deployment can include parameters such as latency and throughput. Latency can indicate latency requirements for the service. Example of latency parameters can include maximum latency, minimum latency, average latency, etc. Throughput parameters can indicate throughput requirements for the service. Examples of throughput parameters can include maximum throughput, minimum throughput, average throughput, etc. Hardware requirements can indicate hardware requirements for media processing, such as central processing unit cores, graphic processing units, virtual graphic processing unit, random access memory, processor requirements, storage, disk requirements, etc. Security requirements can include encryption mechanisms. When the external service provider network 704 indicates the above requirements, it is up to the network operator to translate those requirements into a deployment between a core network 404, an edge network 406, or both.

Although FIG. 12 illustrates a media streaming architecture 1200, various changes may be made to FIG. 12. For example, the media streaming architecture 1200 and its individual components can vary as needed or desired. Also, the number and placement of various components of the media streaming architecture 1200 can vary as needed or desired. In addition, the media streaming architecture 1200 may be used in any other suitable media streaming process and is not limited to the specific processes described above.

In the description FIGS. 8-12, workloads are deployed in the operator core network 404, edge network 406, or both. For configuration of deployment across different parts of the operator core network 404, the external service provider network 704 may need mechanisms to allow dictating deployment of workloads at specific locations of the network. To support this requirement, the interface from external service provider network into the operator core network 404 (e.g., through the M1d provisioning interface defined in 3GPP TS 26512) is to be enhanced to include a request to enable edge processing and a processing template.

The request to enable edge processing is indicated by the external service provider network 704 by adding a field called "enable-edge-processing" to an existing provisioning interface. The semantics of this field can include a request to enable edge processing for the service. Possible values of the enable-edge-processing field can include "true" for indicating that the external service provider network 704 intends that the operator use edge processing for this media service and "false" for indicating that the external service provider network 704 intends that the operator does not use edge processing for this service.

The structure of the processing template indicates how processing for ingested content should take place, where it should take place, etc. The processing template can be defined with one or more of the parameters in Table 1 below

| Parameter Name | Description |
| --- | --- |
| Location | Indicates where the processing should take place. Probable values include: Operator Core: If this option is requested, all the processing is deployed only in operator core network. The operator shall provision required application functions and application servers for realizing the service in the operator core network Operator Edge: If this option is requested, all the processing is deployed in operator edge network 406. The operator shall provision required application functions and application servers for realizing the service in the operator edge network 406 Operator Core + Operator Edge: If this option is requested, all the processing is deployed across both the operator core and the operator edge. The application functions required for the service shall be deployed by the operator in both the core network and the edge network 406 Multi Edge Service Provider Networks: If this option is requested, the processing is deployed in multiple edge networks 406 if available. If the UE is in a location where there are multiple edge service providers, processing can be deployed across one or more or all edge service networks available. Operator Core + Multi Edge Service Provider Networks: In this option, processing is deployed in operator core and across multiple edge service provider networks Note: If multi-edge service provider network deployment is desired by the external application provider, in addition to requesting one of the above options, the application provider can include a subset of edge provider networks in edge-networks parameter |
| Edge-networks | List of edge networks 406 where the deployment is sought |
| Processing Distribution Template | Processing Distribution template indicates the list of processing functionalities and how they can be distributed. Processing functionalities can be indicated in the form of a list of functions. In this case, each function can be requested to be run either in the core or edge as given below: |

| Function | Where to run |
| --- | --- |
| Function 1 | Core |
| Function 2 | Core |
| Function 3 | Edge Network Id |

The external service provider network 704 can provide a processing template for deployment of workload or workflow functions in the core network 404, the edge network 406, or both. When the workloads are requested to be deployed in an edge network 406, the external service provider network 704 provides the edge network Ids where one or more functions in the NBMP workflow 810 has to run.

Figure 13:
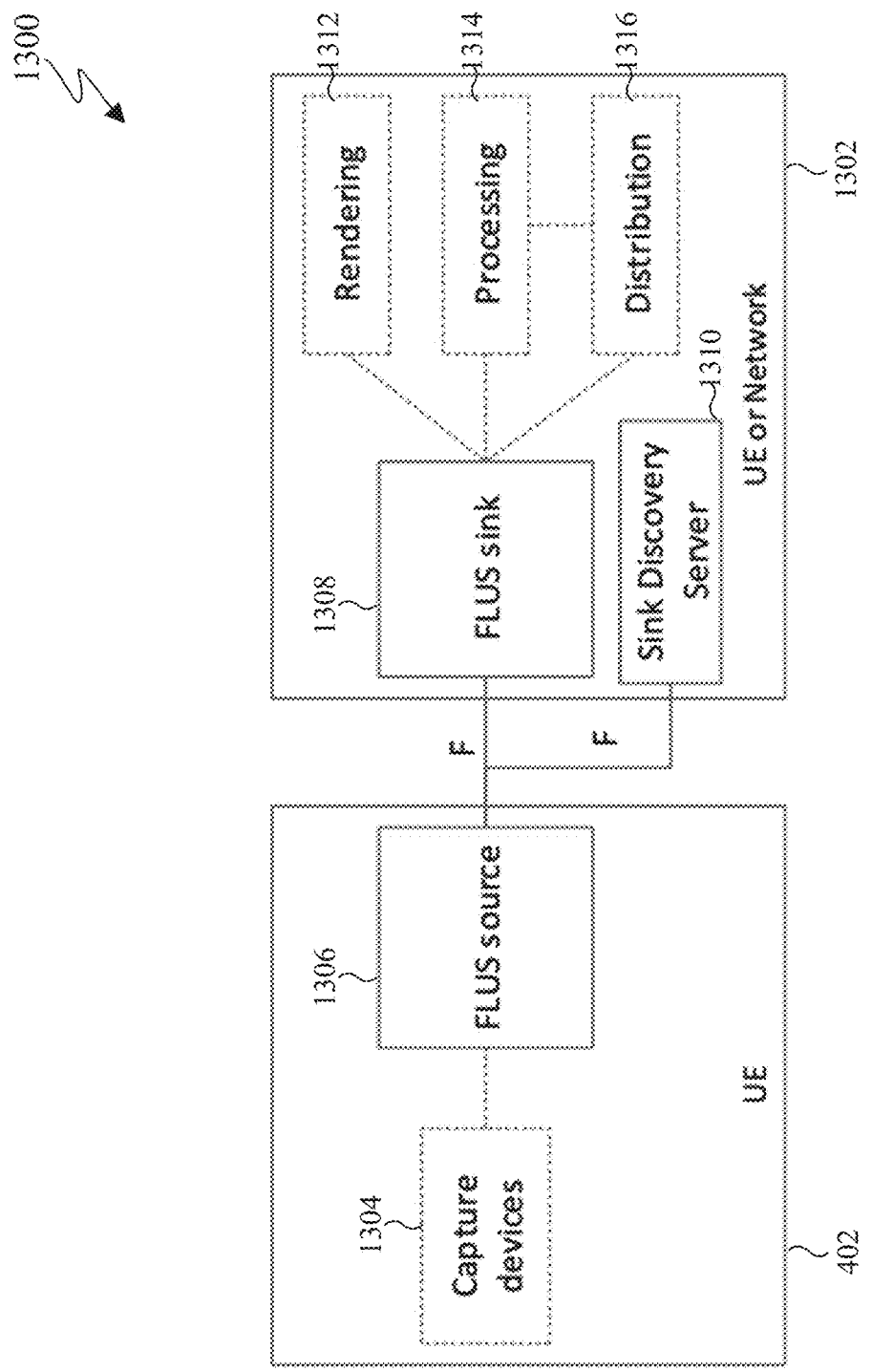
FIG. 13 illustrates an example flexible live uplink streaming (FLUS) architecture in accordance with this disclosure.

FIG. 13 illustrates a FLUS architecture 1300 in accordance with this disclosure. The embodiment of the FLUS architecture 1300 illustrated in FIG. 13 is for illustration only. FIG. 13 does not limit the scope of this disclosure to any particular implementation of an electronic device.

As shown in FIG. 13, an architecture 1300 for FLUS (Flexible Live Uplink Streaming) is described in GPP TS 26.238 and 3GPP TR 26939. The FLUS architecture 1300 can include a UE 402 and a FLUS network 1302. The UE 402 can include a capture device 1304 and a FLUS source 1306. The FLUS network 1302 can include a FLUS sink 1308, a sink discovery server 1310, a rendering function 1312, a processing function 1314, and a distribution function 1316.

A FLUS source 1306 establishes a session with a FLUS sink 1308 for uplink live streaming. Once the content is streamed to the FLUS sink 1308, the content is then sent to any one or more of rendering function 1312, a processing function 1314, and a distribution function 1316. For identification of relevant FLUS sinks 1308, a sink discovery server 1310 is used.

While 3GPP FLUS (and 3GPP TS 26.238) is a specification for a specific type of service (live uplink streaming), NBMP (ISO/IEC 23090-8 respectively) describes an enabler for realizing media processing in the network for any type of media service. In this context, it will be useful for providing FLUS service using an NBMP enabler.

The true value of NBMP, as standardized in ISO/IEC 23090-8, is to leverage media processing in the network/cloud. In cases where a UE 402 is the FLUS sink 1308, network processing may happen during the FLUS session. Alternatively, if the FLUS sink 1308 is a network sink, the processing of media data happens after the network FLUS sink 1308 receives the media data (e.g., post-processing as shown in 3GPP TR 26939). To take advantage of NBMP, the processing of media data in the FLUS architecture 1300 can be setup in the FLUS network 1302 before the processed media data is stored/distributed to UE 402.

Clause 10 in 3GPP TR 26939 describes end-to-end message flows for two different kinds of live uplink streaming services, mobile operator provided and third party provided. Both these message flows describe uplink streaming service message flows when the FLUS sink 1308 is a network FLUS sink.

FLUS specification TS 26.238 describes the capabilities of a FLUS sink, i.e., FLUS sink configuration properties. The NBMP specification ISO/IEC 23090-8 describes the NBMP workflow manager 802 as the control entity that receives workflow description document from an NBMP source 806 and sets up required processing in the network based on information in the workflow description document. FLUS specification describes a control FLUS sink 1308 as the control entity that receives the processing description from FLUS source 1306. The FLUS sink 1308 forwards the media to relevant processing functions 1314 and distribution functions 1316. The control FLUS sink 1308 can act as a workflow manager 802 while using NBMP system to deliver FLUS service. However, not all FLUS sinks 1308 can function as a workflow manager 802. To facilitate identification of FLUS Sinks 1308 that can perform the functions of NBMP workflow manager 802, the capabilities of FLUS sink 1308 can be enhanced with a new property called "is_nbmp_workflow_manager" and the value to be set to either "True" or "False". A value of "True" for this property indicates that the FLUS sink 1308 is capable to perform functions of a NBMP workflow manager 802 as described in ISO/IEC 23090-8. A value of "False" for this property indicates that the FLUS sink 1308 is not capable to perform functions of a NBMP workflow manager 802 as described in ISO/IEC 23090-8. To facilitate discovery of multiple FLUS sinks 1308 that can perform the functions of NBMP workflow manager 802 as described in ISO/IEC 23090-8, the FLUS sink discovery server 1310 can return the list of FLUS sinks 1308 that have the above new property "is_nbmp_workflow_manager" set to "True".

NBMP Specification ISO/IEC 23090-8 describes a function repository that stores the list of all function descriptions and any function groups. An NBMP workflow manager 802 can retrieve the list of function descriptions from the function repository 814 and configure the processing workflow 810 based on information in workflow description document. However, there are no corresponding functional elements in FLUS specification. To support selection of a set of processing functions to apply for FLUS sessions after the content is ingested, the FLUS control sink 1402 acting as the workflow manager 802 to also perform functions of a function repository. To facilitate this, the capabilities of FLUS sink 1308 are expanded to include an additional property called "processing_functions_list". The value of this property is a list of function descriptions that the FLUS sink 1308 can apply to the media received to the FLUS sink 1308. The FLUS source 1306 is aware of the identities of the functions in this list before the sink configuration.

To describe the list of distribution methods available for FLUS sessions, it is proposed that the capabilities of FLUS sink 1308 be enabled with a property called "available-distribution-mechanisms" which is a list of possible distribution mechanisms if that FLUS sink 1308 is selected. Each distribution mechanism can include the fields "distribution_methods", "distribution_format", and "storage_format". The "distribution_methods" field can indicate an array of possible distribution methods, including unicast, multicast, broadcast, etc. The "distribution_format" field can indicate a format of distribution is supported, including standard distribution formats for streaming such as dynamic adaptive streaming (DASH), hypertext transfer protocol (HTTP) live streaming (HLS), MPEG media transport protocol (MMTP), etc. The "storage_format" field can indicate a format of media storage and can indicated if processed media is requested to be stored instead of streamed.

Specific functions that implement the above distribution mechanisms can be included in the list of functions in the "processing_functions_list" property of a FLUS sink 1308. These distribution functions can be selected by the FLUS sink 1308 based on the information in the processing description received from FLUS source 1306.

Although FIG. 13 illustrates a FLUS architecture 1300, various changes may be made to FIG. 13. For example, the FLUS architecture 1300 and its individual components can vary as needed or desired. Also, the number and placement of various components of the FLUS architecture 1300 can vary as needed or desired. In addition, the FLUS architecture 1300 may be used in any other suitable uplink streaming process and is not limited to the specific processes described above.

Figure 14:
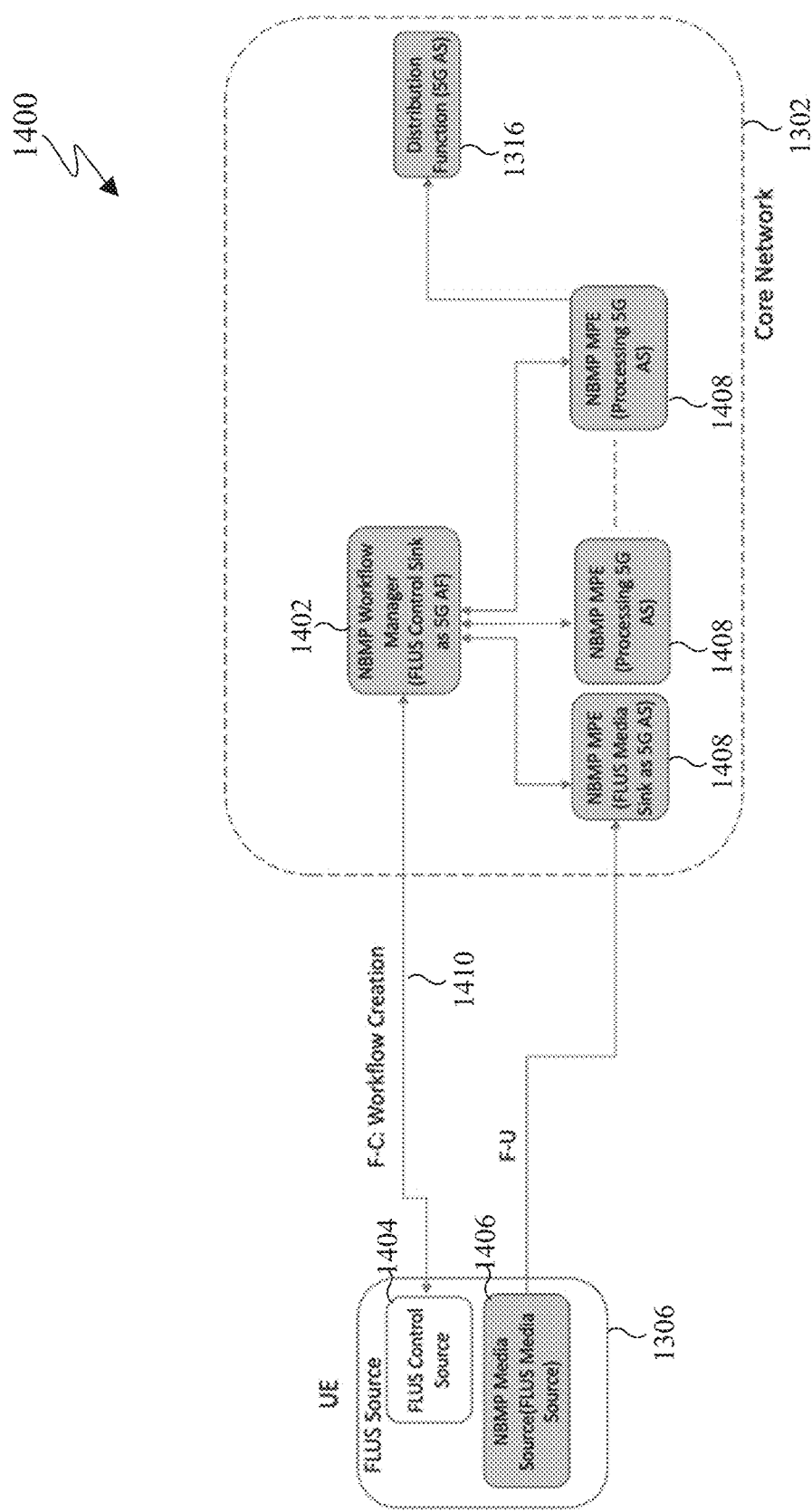
FIG. 14 illustrates a mobile operator provided live uplink streaming service with NBMP in accordance with this disclosure.

FIG. 14 illustrates a mobile operator provided live uplink streaming service 1400 with NBMP in accordance with this disclosure. The embodiment of the live uplink streaming service 1400 illustrated in FIG. 14 is for illustration only. FIG. 14 does not limit the scope of this disclosure to any particular implementation of an electronic device.

As shown in FIG. 14, the FLUS service is setup between the FLUS source 1306 and FLUS sink 1308 as described in clause 10.2 of 3GPP TR 26939. With FLUS control sink 1402 taking the role of a NBMP workflow manager 802, FLUS media sinks 1408 taking the role of NBMP MPE 808, and a FLUS media source 1406 at the FLUS source 1306 taking the role of NBMP media source, and control source at FLUS source taking the role of NBMP source, a FLUS service with NBMP can be provided.

A FLUS control sink 1402 can assume the role of NBMP workflow manager 802 and receive a workflow creation request from FLUS control source 1404 using F-C interface 1410. The FLUS control sink 1402 then sets up one or more FLUS media sinks 1408 as an NBMP MPE 808 to receive content from FLUS media source 1406. The NBMP workflow manager 802 also sets up one or more NBMP MPEs 808 with each MPE 808 running one or more processing functions that are described in clause 10.2 of 3GPP TR 26939 to create an NBMP workflow 810. The final resultant processed media data/metadata is then sent to the distribution function 1316 that is defined in clause 10.2 of 3GPP TR 26939. The distribution function 1316 can also be an NBMP MPE 808 running functions for standardized distribution technologies.

Although FIG. 14 illustrates a live uplink streaming service 1400, various changes may be made to FIG. 14. For example, the live uplink streaming service 1400 and its individual components can vary as needed or desired. Also, the number and placement of various components of the live uplink streaming service 1400 can vary as needed or desired. In addition, the live uplink streaming service 1400 may be used in any other suitable uplink streaming process and is not limited to the specific processes described above.

Figure 15:
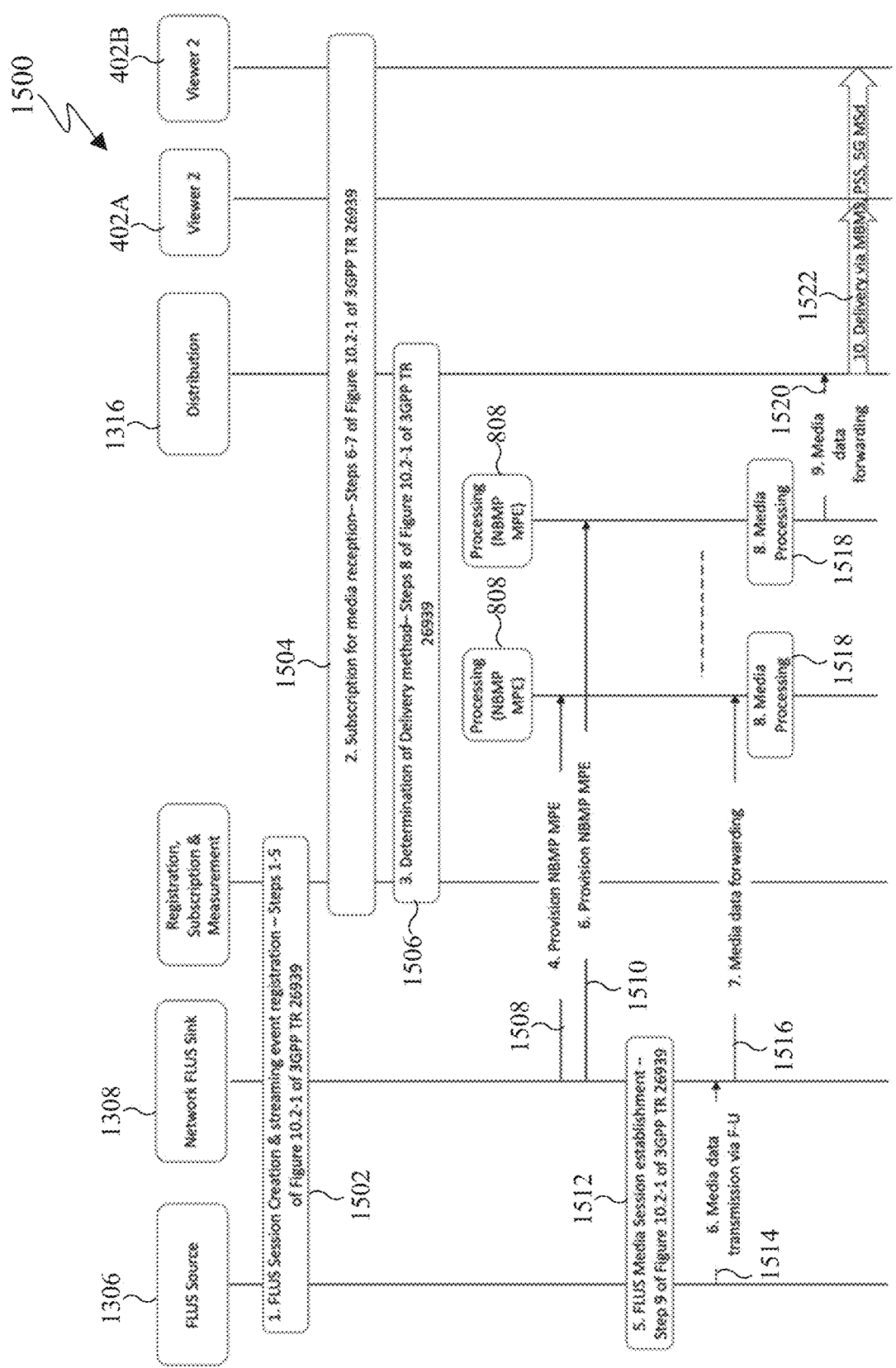
FIG. 15 illustrates an end-to-end message flow for mobile network operator (MNO) provided live uplink streaming service using NBMP in accordance with this disclosure.

FIG. 15 illustrates an end-to-end message flow 1500 for mobile network operator (MNO) provided live uplink streaming service using NBMP in accordance with this disclosure. The embodiment of the end-to-end message flow 1500 illustrated in FIG. 15 is for illustration only. FIG. 15 does not limit the scope of this disclosure to any particular implementation of an electronic device.

As shown in FIG. 15, an end-to-end message flow 1500 is provided for MNO-provided live uplink streaming service using NBMP. In step 1502, a FLUS session is created between FLUS source 1306 and network FLUS sink 1308, and a streaming event is registered as described in steps 1-5 in clause 10.2 of 3GPP TR 26939. In step 1504, subscription of media reception to intended users, such as a first UE 402 and a second UE 402B, as described in steps 6-7 of clause 10.2 of 3GPP TR 26939. In step 1506, a determination of a delivery method is identical to step 8 of clause 10.2 of 3GPP TR 26939. In steps 1508 and 1510, the network FLUS control sink 1308 assumes the role of a network workflow manager 802 to provision and configure one or more NBMP MPEs 808 for processing of media data. In step 1512, FLUS media session is established identical to step 9 of clause 10.2 of 3GPP TR 26939. In step 1514, media data transmission via F-U to the FLUS media sink 1308 is identical to step 10 of clause 10.2 of 3GPP TR 26939. In step 1516, the media data is forwarded by network FLUS sink 1308 to other NBMP MPEs 808 for further media processing. In step 1518, the received media from FLUS media sink 1308 is processed by the MPEs 808 in the media processing workflow 810. In step 1520, the processed media is sent to the distribution function 1316 identical to step 13 of clause 10.2 of 3GPP TR 26939 for distribution. In step 1522, the media is delivered to all the UEs 402A, 402B, identical to step 14 of clause 10.2 of 3GPP TR 26939. An additional delivery method using 5GMSd is possible as defined in 3GPP TS 26512.

The procedure described in relation to FIG. 15 above can be used to setup network media processing during a FLUS session in a 5G mobile operator network. The FLUS control sink 1402 assumes the role of NBMP workflow manager 802 can be a signaling application function 518 (5G AF) as described in 3GPP TS 26501. The FLUS media sink 1408 can be a media application function 520 (5G AS) as described in 3GPP TS 26501. Individual NBMP MPEs 808 in the operator network can be media application functions (5G AS) as described in 3GPP TS 26501. The distribution function can be a media application function (5G AS) as described in 3GPP TS 26501.

Although FIG. 15 illustrates an end-to-end message flow 1500, various changes may be made to FIG. 5. For example, the end-to-end message flow 1500 and its individual components can vary as needed or desired. Also, the number and placement of various components of the end-to-end message flow 1500 can vary as needed or desired. In addition, the end-to-end message flow 1500 may be used in any other suitable uplink streaming process and is not limited to the specific processes described above.

Figure 16:
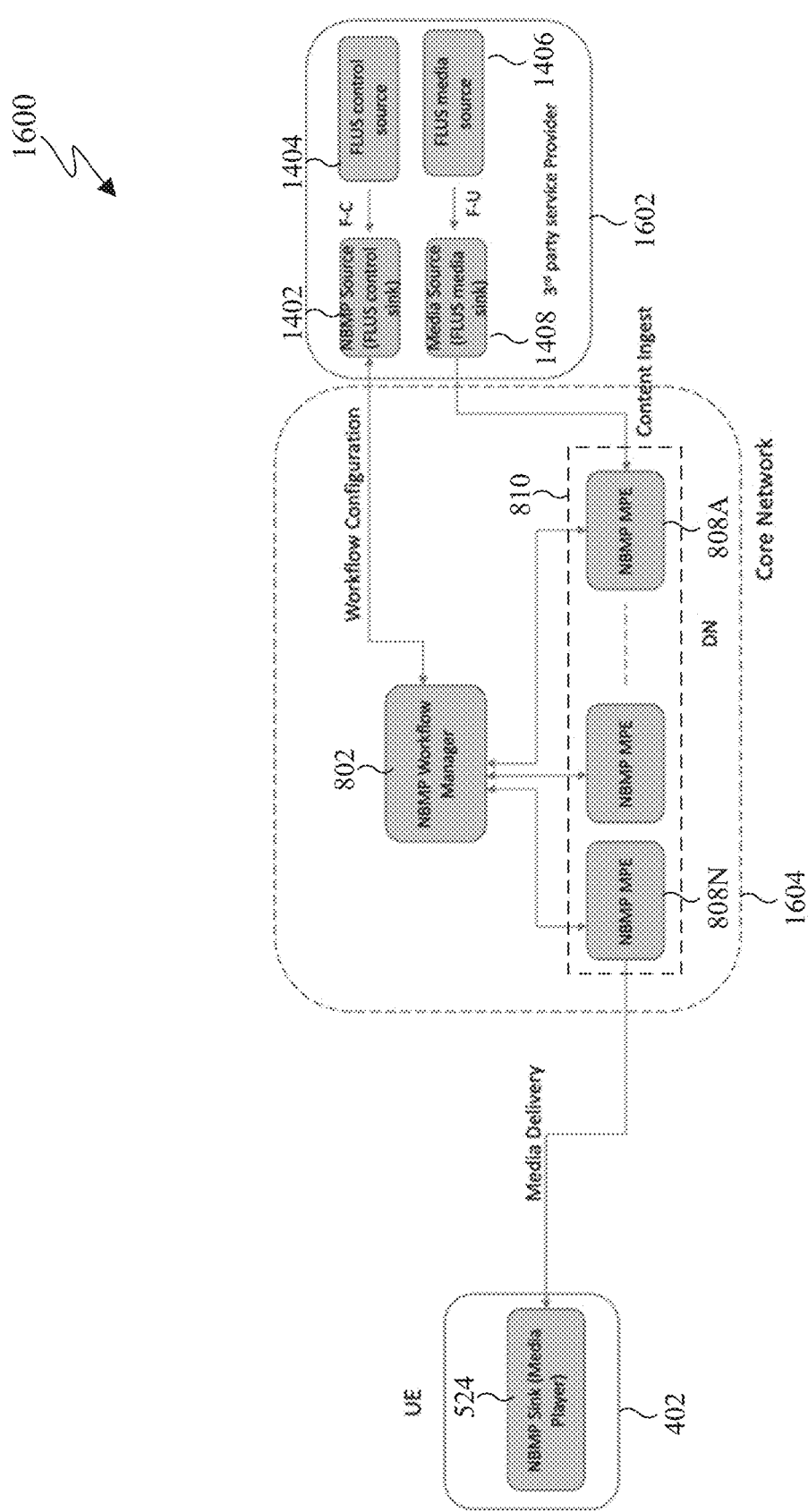
FIG. 16 illustrates a third party provided live uplink streaming service with NBMP in accordance with this disclosure.

FIG. 16 illustrates a third party provided live uplink streaming service 1600 with NBMP in accordance with this disclosure. The embodiment of the third party provided live uplink streaming service 1600 illustrated in FIG. 16 is for illustration only. FIG. 16 does not limit the scope of this disclosure to any particular implementation of an electronic device.

As shown in FIG. 16, the FLUS service is setup between the FLUS source 1306 and FLUS sink 1308 as described in clause 10.3 of 3GPP TR 26939. The FLUS source 1306 and FLUS sink 1308 are outside the MNO network in the third-party service provider network 1602. The FLUS sink 1308 uses the MNO network to distribute the processed content to MNO users as described in clause 10.3 of 3GPP TS 26939. In this option of realizing FLUS with NBMP, the processing function 1314, in addition to the distribution function 1316, can be run inside the MNO network using NBMP.

A FLUS control sink 1402 requests the NBMP workflow manager 802 inside the MNO network 1604 to create a workflow for processing and distribution. The workflow manager, based on the workflow creation request, sets up one or more NBMP MPEs inside the MNO network 1604. Each MPE 808 runs a processing function that is described in clause 10.3 of 3GPP TS 26939. The media content is ingested from FLUS media sink 1408 outside the MNO network 1604 into the MNO network 1604. The ingested content is then processed in one or more MPEs 808 and then the final result is streamed to UE 402.

Although FIG. 16 illustrates a third party provided live uplink streaming service 1600, various changes may be made to FIG. 16. For example, the third party provided live uplink streaming service 1600 and its individual components can vary as needed or desired. Also, the number and placement of various components of the third party provided live uplink streaming service 1600 can vary as needed or desired. In addition, the third party provided live uplink streaming service 1600 may be used in any other suitable uplink streaming process and is not limited to the specific processes described above.

Figure 17:
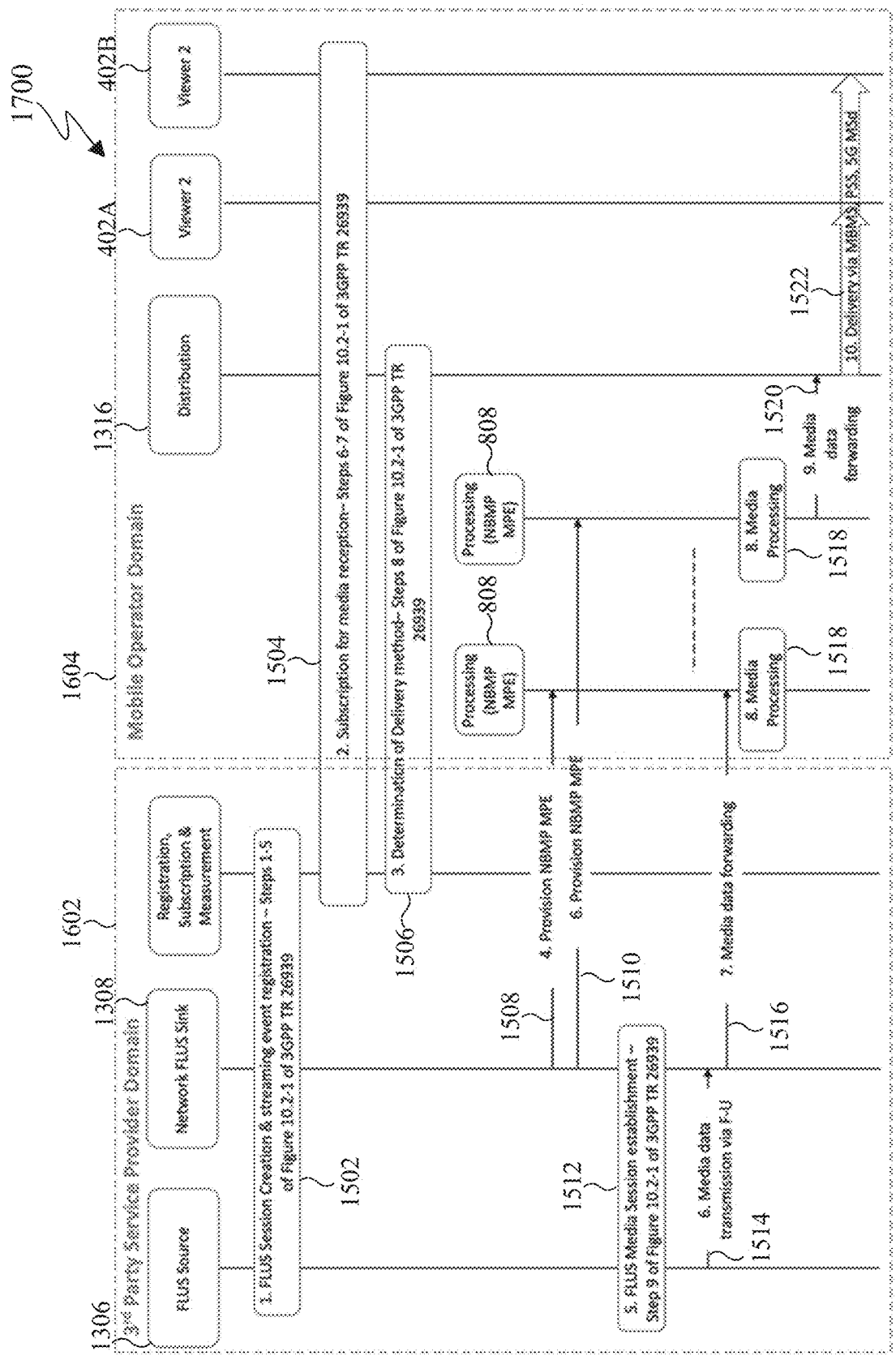
FIG. 17 illustrates an end-to-end message flow for a third party provided live uplink streaming service with NBMP in accordance with this disclosure.

FIG. 17 illustrates an end-to-end message flow 1700 for a third party provided live uplink streaming service with NBMP in accordance with this disclosure. The embodiment of the end-to-end message flow 1700 illustrated in FIG. 17 is for illustration only. FIG. 17 does not limit the scope of this disclosure to any particular implementation of an electronic device.

As shown in FIG. 17, an end-to-end message flow 1700 for third party provided live uplink streaming service with processing and downlink distribution handled by the mobile operator is provided. 1-10: The description for each of the numbered transactions between the entities in the message flow of FIG. 17 is identical to the counterpart numbered step as shown in FIG. 15. The difference in FIG. 17 is that some of the network entities belong to the third-party service provider network 1602 while the others belong to the MNO network 1604. While in FIG. 15, the network entities all belong to the MNO network 1604. Another difference is that UEs associated with viewers 1 to N in FIG. 17 are considered to be associated with or belong to both the third-party provider network 1602 and the MNO network 1604, while those viewers are strictly associated with or belong to the mobile operator in FIG. 15.

Although FIG. 17 illustrates an end-to-end message flow 1700, various changes may be made to FIG. 17. For example, the end-to-end message flow 1700 and its individual components can vary as needed or desired. Also, the number and placement of various components of the end-to-end message flow 1700 can vary as needed or desired. In addition, the end-to-end message flow 1700 may be used in any other suitable uplink streaming process and is not limited to the specific processes described above.

Figure 18:
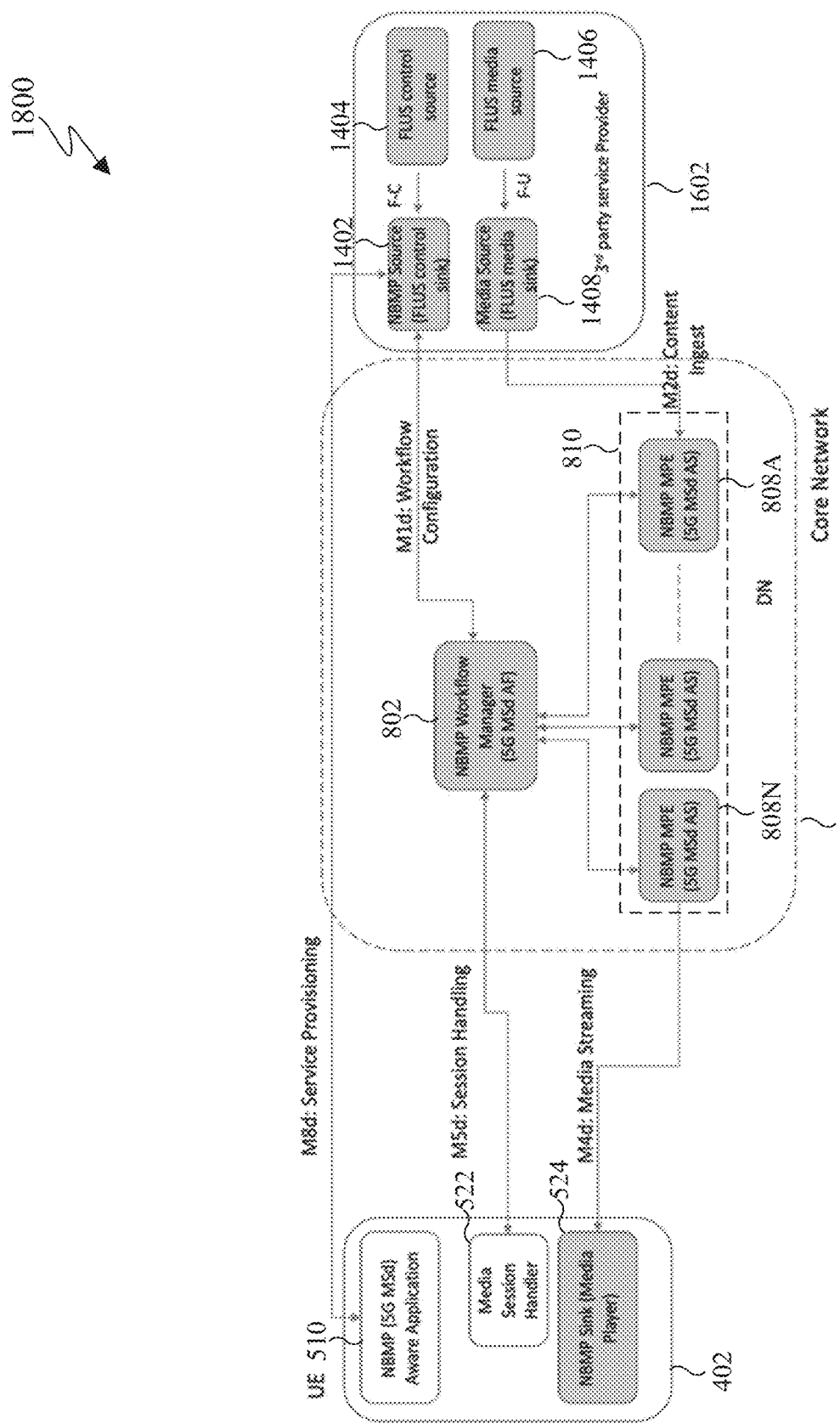
FIG. 18 illustrates a network architecture for a third party provided live uplink streaming service with NBMP in accordance with this disclosure.

FIG. 18 illustrates a network architecture 1800 for a third party provided live uplink streaming service with NBMP in accordance with this disclosure. The embodiment of the network architecture 1800 illustrated in FIG. 18 is for illustration only. FIG. 18 does not limit the scope of this disclosure to any particular implementation of an electronic device.

As shown in FIG. 18, procedures described earlier can be used to setup network media processing during a FLUS session in an MNO network 1604. The FLUS control sink 1402 requests creation of a workflow to a NBMP workflow manager 802 that is run as a signaling application function (5G AF) as described in 3GPP TS 26501. For a workflow creation request, an M1d interface 628 specified in 3GPP TS 26512 is used.

The FLUS media sink 1408 in the third-party service provider network 1602 ingests content into a first NBMP MPE 808A inside the MNO network 1604. The content ingestion is performed according to M2d interface as specified in 3GPP TS 26512. Each of the NBMP MPEs 808A-808N in the MNO network 1604 are media application functions 520 (5G AS) as specified in 3GPP TS 26501. The final processed media is streamed to UEs 402 using an M4d media streaming interface 630 specified in 3GPP TS 26512.

Although FIG. 18 illustrates a network architecture 1800, various changes may be made to FIG. 18. For example, the network architecture 1800 and its individual components can vary as needed or desired. Also, the number and placement of various components of the network architecture 1800 can vary as needed or desired. In addition, the network architecture 1800 may be used in any other suitable uplink streaming process and is not limited to the specific processes described above.

Figure 19:
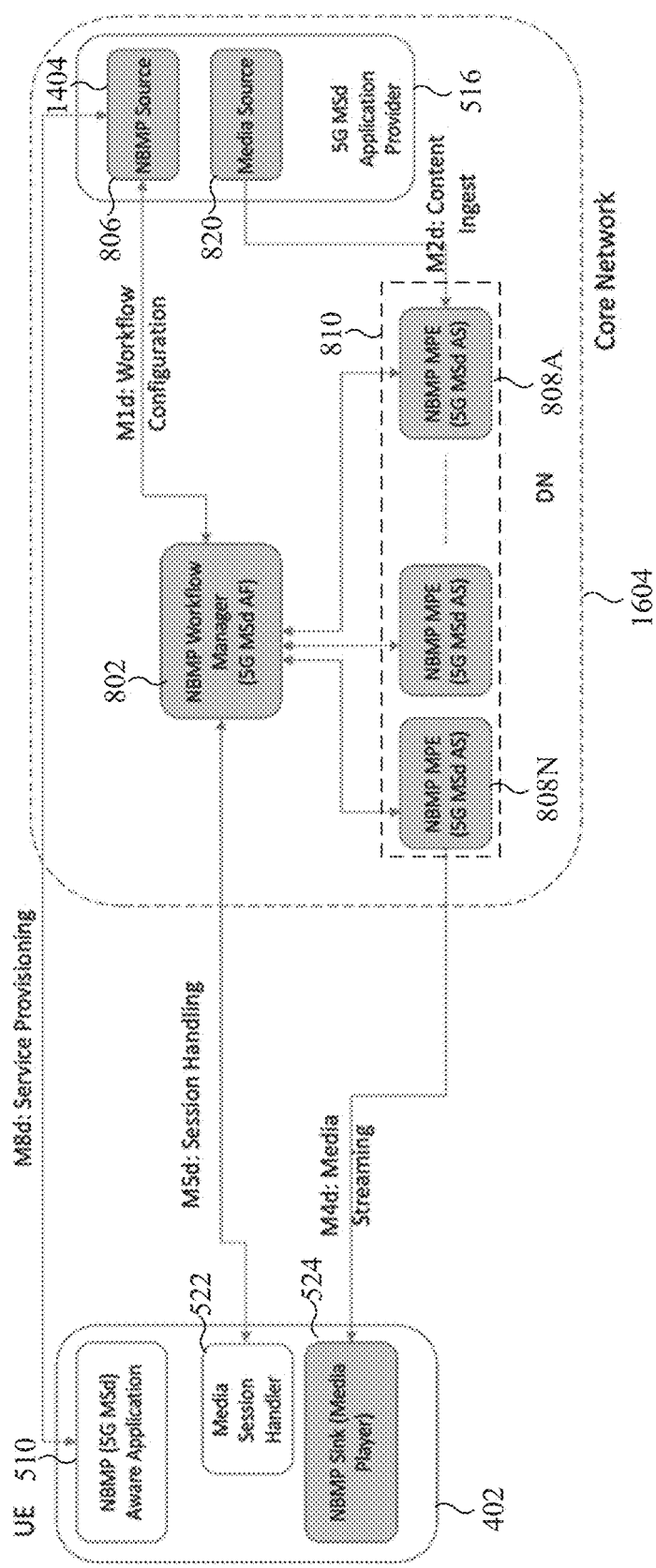
FIG. 19 illustrates a media delivery architecture using NBMP in accordance with this disclosure.

FIG. 19 illustrates a media delivery architecture 1900 using NBMP in accordance with this disclosure. The embodiment of the media delivery architecture 1900 illustrated in FIG. 19 is for illustration only. FIG. 19 does not limit the scope of this disclosure to any particular implementation of an electronic device.

As shown in FIG. 19, an NBMP overlays a generic 5G system media delivery perspective. With this overlay, any 5G media delivery services can be provided using NBMP. The NBMP can be used for any 5G media service. With this architecture 1900, an M1d API provisioning API (described in 3GPP TS 26.512) is used for a workflow API. M3u' API (modified version of M3u API described in 3GPP TS 26.512) can be used for a task API. A signaling application function 518 (5GMSd AF) can be used as the workflow manager 802. A media application function 520 (5GMsd AS) can be used as an NBMP MPE 808.

In certain embodiments, none of the FLUS sink 1308 can act as a workflow manager 802. However, a FLUS sink 1308 can be configured with the information of an IP endpoint to a server/service that acts as NBMP workflow manager 802. To facilitate this, the capabilities of the FLUS sink 1308, described in TS 26.238, can be enhanced with a new property called "workflow_manager_url". The value of this property points to the URL representing the location of the workflow manager server.

Although FIG. 19 illustrates a media delivery architecture 1900, various changes may be made to FIG. 19. For example, the media delivery architecture 1900 and its individual components can vary as needed or desired. Also, the number and placement of various components of the media delivery architecture 1900 can vary as needed or desired. In addition, the media delivery architecture 1900 may be used in any other suitable media delivery process and is not limited to the specific processes described above.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus functioning as a signaling application function in a core network, the apparatus comprising:
   a communication interface configured to receive, from an application provider, a signaling message for provisioning into a network-based media processing (NBMP) workflow manager, wherein the signaling message includes a processing template with one or more parameters that control processing of content in a workflow, and wherein the processing template includes a list of edge networks to deploy at least one media processing entity in the workflow; and
   a processor operably coupled to the communication interface, wherein the processor is configured to:
   assume a role of the NBMP workflow manager;
   communicate with an edge configuration server and an edge enabler server in an edge network to determine functionality of edge media application functions in the edge network;
   provision at least one media application function as the at least one media processing entity in the workflow, wherein, when the functionality of the edge media application functions can partly process the content in the workflow, to provision the at least one media application function includes to provision a first media processing entity in the core network and a second media processing entity in the edge network;
   instruct a media source to provide content for processing to the at least one media processing entity; and
   instruct the at least one media processing entity in the workflow to provide the processed content to a user equipment (UE).

2. The apparatus of claim 1, wherein:
the functionality of the edge media application functions cannot process content in the workflow, and the at least one media processing entity is provisioned in the core network.

3. The apparatus of claim 1, wherein:
the functionality of the edge media application functions can process content in the workflow, and
the at least one media processing entity is provisioned in the edge network.

4. The apparatus of claim 1, wherein: the functionality of the edge media application functions can partly process the content in the workflow,
the at least one media processing entity includes a first media processing entity provisioned in the edge network, and
the processor is further configured to:
communicate with a second edge configuration server and a second edge enabler server in a second edge network to determine functionality of edge media application functions in the second edge network,
provision at least one second media application function as at least one second media processing entity in the workflow;
instruct a media source to provide content for processing to the at least one second media processing entity; and
instruct the at least one second media processing entity in the workflow to provide the processed content to the UE.

5. The apparatus of claim 1, wherein:
the functionality of the edge media application functions can partly process the content in the workflow,
the at least one media processing entity includes a first media processing entity provisioned in the edge network, and
the processor is further configured to:
communicate with a second edge configuration server and a second edge enabler server in a second edge network to determine functionality of edge media application functions in the second edge network, wherein the functionality of the edge media application functions in the second edge network can partly process remaining content in the workflow,
provision at least one second edge media application function in the second edge network as at least one second media processing entity in the workflow;
provision at least one media application function in the core network as a media processing entity in the workflow;
instruct a media source to provide content for processing to the at least one second media processing entity in the second edge network and to the media processing entity in the core network; and
instruct the at least one second media processing entity in the workflow to provide the processed content to the UE.

6. The apparatus of claim 1, wherein the signaling message includes a field for indicating requirement for edge processing.

7. The apparatus of claim 1, wherein the processing template includes a list of processes to run in the edge network and the core network.

8. An apparatus functioning as a signaling application function in an edge network, the apparatus comprising:
a communication interface configured to receive, from an application provider or a network-based media processing (NBMP) workflow manager in a core network, a signaling message for provisioning into an edge NBMP workflow manager, wherein the signaling message includes a processing template with one or more parameters that control processing of a content in a workflow, and wherein the processing template includes a list of edge networks to deploy at least one media processing entity in the workflow; and
a processor operably coupled to the communication interface, wherein the processor is configured to:
assume a role of the edge NBMP workflow manager;
provision at least one edge media application function as the at least one media processing entity in the workflow;
instruct a media source to provide the content for processing to the at least one media processing entity; and
instruct the at least one media processing entity in the workflow to provide the processed content to a user equipment (UE),
wherein, the at least one edge media application function can partly process the content in the workflow,
the at least one edge media application function is configured to receive partly processed content from media processing entities in the core network, and
the processor is further configured to instruct the at least one edge media application function to provide the processed content to a second edge network.

9. The apparatus of claim 8, wherein:
the at least one edge media application function can partly process the content in the workflow, and
the at least one edge media application function is configured to receive partly processed content from media processing entities in the core network.

10. The apparatus of claim 8, wherein:
the at least one edge media application function can partly process the content in the workflow, and
the at least one edge media application function is configured to receive partly processed content from media processing entities in a second edge network.

11. The apparatus of claim 8, wherein the signaling message includes a field for indicating a requirement for edge processing.

12. The apparatus of claim 8, wherein the processing template includes a list of processes to run in the edge network and the core network.

13. A method for an apparatus functioning as a signaling application function in a core network, the method comprising:
receiving, using a communication interface of the apparatus, a signaling message for provisioning into a network-based media processing (NBMP) workflow manager from an application provider, wherein the signaling message includes a processing template with one or more parameters that control processing of content in a workflow, and wherein the processing template includes a list of edge networks to deploy at least one media processing entity in the workflow; and
assuming, using a processor operably coupled to the communication interface, a role of the NBMP workflow manager;
communicating, using the processor, with an edge configuration server and an edge enabler server in an edge network to determine functionality of edge media application functions in the edge network;
provisioning, using the processor, at least one media application function as the at least one media processing entity in the workflow, wherein, when the functionality of the edge media application functions can partly process the content in the workflow, provisioning the at least one media application function includes provisioning a first media processing entity in the core network and a second media processing entity in the edge network;

instructing, using the processor, a media source to provide content for processing to the at least one media processing entity; and instructing, using the processor, the at least one media processing entity in the workflow to provide the processed content to a user equipment (UE).

14. The method of claim 13, wherein:

the functionality of the edge media application functions can partly process the content in the workflow, the at least one media processing entity includes a first media processing entity provisioned in the edge network, and the method further comprises:

communicating, using the processor, with a second edge configuration server and a second edge enabler server in a second edge network to determine functionality of edge media application functions in the second edge network, provisioning, using the processor, at least one second media application function as at least one second media processing entity in the workflow;

instructing, using the processor, a media source to provide content for processing to the at least one second media processing entity; and instructing, using the processor, the at least one second media processing entity in the workflow to provide the processed content to the UE.

15. The apparatus of claim 13, wherein:

the functionality of the edge media application functions can partly process the content in the workflow, the at least one media processing entity includes a first media processing entity provisioned in the edge network, and the method further comprises:

communicating with a second edge configuration server and a second edge enabler server in a second edge network to determine functionality of edge media application functions in the second edge network, wherein the functionality of the edge media application functions in the second edge network can partly process remaining content in the workflow, provisioning at least one second edge media application function in the second edge network as at least one second media processing entity in the workflow;

provisioning at least one media application function in the core network as a media processing entity in the workflow;

instructing a media source to provide content for processing to the at least one second media processing entity in the second edge network and to the media processing entity in the core network; and instructing the at least one second media processing entity in the workflow to provide the processed content to the UE.

16. The method of claim 13, wherein the signaling message includes a field for indicating requirement for edge processing.

* * * * *